United States Patent [19]

Singhi et al.

[11] 4,387,420

[45] Jun. 7, 1983

[54] PROGRAMMABLE CLOCK

[75] Inventors: Dilip T. Singhi, Skokie; James E. Dahlquist, Palatine, both of Ill.

[73] Assignee: Rauland-Borg Corporation, Chicago, Ill.

[21] Appl. No.: 210,544

[22] Filed: Nov. 26, 1980

[51] Int. Cl.³ ............................................ G06F 15/46

[52] U.S. Cl. ..................................... 364/145; 307/38; 340/309.4; 340/365 R; 364/146; 364/569; 371/29

[58] Field of Search ............... 364/144, 145, 146, 147, 364/492, 493, 569; 307/38–41, 141, 141.4; 340/309.1, 309.3, 309.4, 365 R, 365 E; 368/155; 455/171, 181, 231, 179, 152; 371/20, 29, 57

[56] References Cited

U.S. PATENT DOCUMENTS

| | | | |
|---|---|---|---|
| 4,158,432 | 6/1979 | Van Bavel | 371/20 |
| 4,165,532 | 8/1979 | Kendall et al. | 364/145 X |
| 4,176,395 | 11/1979 | Evelyn-Veere et al. | 364/146 X |
| 4,193,120 | 3/1980 | Yello | 364/145 |
| 4,217,646 | 8/1980 | Caltagirone et al. | 364/145 X |
| 4,279,012 | 7/1981 | Beckedorff et al. | 364/145 |
| 4,293,915 | 10/1981 | Carpenter et al. | 364/146 X |
| 4,325,081 | 4/1982 | Abe et al. | 364/144 X |

OTHER PUBLICATIONS

Paragon EC700 Programmable Time Controller–Bulletin 2070, Oct. 1979.

Simplex 2400 Energy Management System–Simplex Time Recorder Co. Gardner, Mass. 01441, 1979.

Simplex 2350 Master Time System–Simplex Time Recorder Co., Gardner, Mass. 01441, 1980.

Autoswitch Precise Time Control–Rothenbuhler Engineering, 2191 Rhodes Road, Sedro Wooley, Washington 98284.

*Primary Examiner*—Joseph F. Ruggiero

*Attorney, Agent, or Firm*—Leydig, Voit, Osann, Mayer & Holt, Ltd.

[57] ABSTRACT

A user programmable clock which is both simple to program and capable of executing relatively complex events. The front panel has a display divided into a plurality of functional blocks, with an operator positionable pointer adapted to activate any block. A single keypad is used to enter data in the respective blocks designated by the pointer. The system allows programming of comparatively complex events, capable of relating a single time to any combination of days and any combination of zones. Event programming is further simplified by providing an immediate indication of an erroneous entry along with a signal distinguishing between various potential types of errors.

25 Claims, 12 Drawing Figures

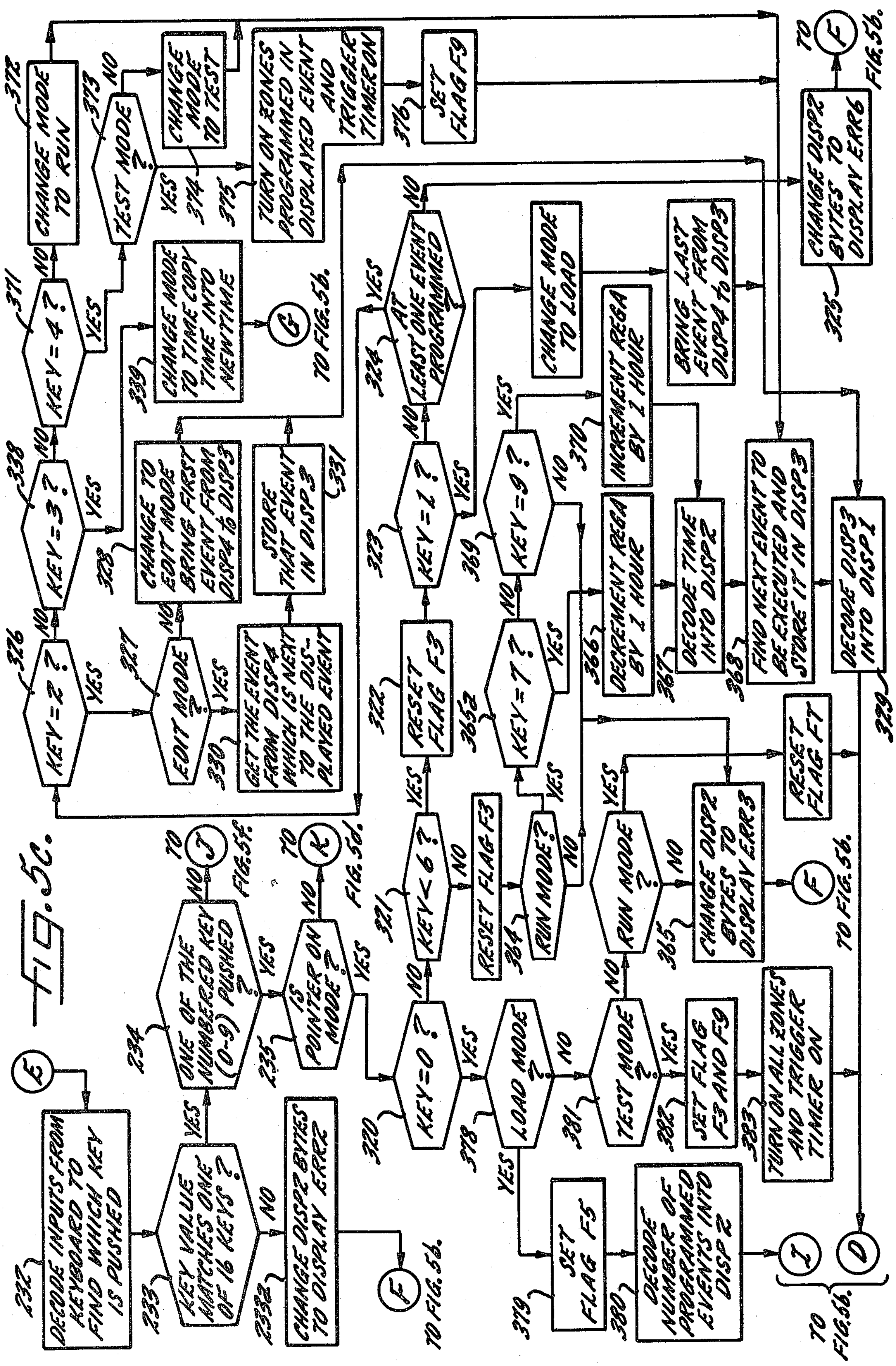
FIG. 5c.
E
232 DECODE INPUTS FROM KEYBOARD TO FIND WHICH KEY IS PUSHED
233 KEY VALUE MATCHES ONE OF 16 KEYS ?
YES
NO
233a CHANGE DISP2 BYTES TO DISPLAY ERR2
F
TO FIG. 5b.
234 ONE OF THE NUMBERED KEY (0-9) PUSHED ?
TO J FIG. 5f.
235 IS POINTER ON MODE ?
TO K FIG. 5d.
320 KEY=0 ?
321 KEY<6 ?
322 RESET FLAG F3
323 KEY=1 ?
324 AT LEAST ONE EVENT PROGRAMMED
325 CHANGE DISP2 BYTES TO DISPLAY ERR6
TO F FIG. 5b.
326 KEY=2 ?
327 EDIT MODE ?
328 CHANGE TO EDIT MODE BRING FIRST EVENT FROM DISP4 to DISP3
329 DECODE DISP3 INTO DISP1
330 GET THE EVENT FROM DISP4 WHICH IS NEXT TO THE DISPLAYED EVENT
331 STORE THAT EVENT IN DISP3
338 KEY=3 ?
339 CHANGE MODE TO TIME COPY TIME INTO NEWTIME
G
TO FIG. 5b.
371 KEY=4 ?
372 CHANGE MODE TO RUN
373 TEST MODE ?
374 CHANGE MODE TO TEST
375 TURN ON ZONES PROGRAMMED IN DISPLAYED EVENT AND TRIGGER TIMER ON
376 SET FLAG F9
364 RESET FLAG F3
RUN MODE ?
365a KEY=7 ?
365 RUN MODE ?
CHANGE DISP2 BYTES TO DISPLAY ERR3
F
TO FIG. 5b.
RESET FLAG F7
366 DECREMENT REGA BY 1 HOUR
367 DECODE TIME INTO DISP2
368 FIND NEXT EVENT TO BE EXECUTED AND STORE IT IN DISP3
369 KEY=9 ?
370 INCREMENT REGA BY 1 HOUR
CHANGE MODE TO LOAD
BRING LAST EVENT FROM DISP4 to DISP3
378 LOAD MODE ?
379 SET FLAG F5
380 DECODE NUMBER OF PROGRAMMED EVENTS INTO DISP2
381 TEST MODE ?
382 SET FLAG F3 AND F9
383 TURN ON ALL ZONES AND TRIGGER TIMER ON
I
D
TO FIG. 5b.

PROGRAMMABLE CLOCK

This invention relates to automatic control of timed events and more particularly to a programmable clock.

Such devices are useful, for example, in schools where class schedules remain relatively fixed and bells or other audible devices are used to signal the beginning and end of each class period. The timing and control problem can become relatively complex because different zones of the school can be on different schedules, the schedule can change from day to day, special events such as holidays or assembly days can dictate a changed schedule for a particular day, and the like. In addition, it is very desirable for the system to provide some simple means for altering the timed events, such as when schedules change, or with the time change to or from daylight savings time.

In the past, the most popular manner of accomplishing automatic control of the timed events described above has involved the employment of electromechanical timing devices. The "events" in such devices were typically programmed by mechanical means such as bending tabs on synchronously rotating wheels, inserting or removing pins in synchronously rotating drums or punching a tape with coded events and inserting the tape into the electromechanical timing mechanism. All of such programming techniques are characterized as comparatively complex and typically require a serviceman to be called in order to alter the program. Even the simple alteration occasioned by switching to or from daylight savings time typically requires the attendance of a serviceman. In addition, electromechanical systems which were capable of providing individual zone control and the like became relatively complex.

There have recently been introduced programmable devices for automatic control of electrical loads such as heating, air conditioning, lighting, and alarm systems which can also be configured to ring bells in schools. Such systems are typically microprocessor based, and usually include a keyboard and display used to guide the event programming function. Insofar as we are aware, such systems generally focused on an "event" as a relatively simple function affecting a single load, a single day, a single time on that day, and a single switching operation. In the school environment where there are often multiple zones on different schedules, differences in schedules from day to day, and the like, the number of events which need to be programmed into such systems expands rather dramatically. In addition, although the systems have keyboards for user programming, for a variety of reasons the programming task can become somewhat complicated, requiring a programmer with a comparatively high degree of skill and training.

In view of the foregoing, it is a general aim of the present invention to provide a user programmable clock which is both simple to program and at the same time capable of executing comparatively complex events.

More particularly, it is an object of the present invention to provide a user programmable clock in which each programmed event can perform a number of functions. Thus, for example, if classes in a particular zone of a school follow a first schedule on Monday, Wednesday and Friday and a different schedule on Tuesday and Thursday, it is an object to provide a clock in which only the two schedules need be programmed, with each programmed event identifying the days of the week on which it is to be executed.

A general object of the present invention is to provide a user programmable clock which aids the user in the programming operation to the extent that it can be effectively operated by non-technical persons after a comparatively slight amount of training. In that regard, it is an object to provide such a clock with means for producing a visual response to each keystroke so that the user is immediately appraised that either (a) his attempted entry has indeed been entered or (b) his attempted entry was illegal. With respect to illegal entries, it is an object to aid the user in programming the clock by providing an indication that an erroneous entry has been made in such a way as to distinguish between types of erroneous entries.

It is a detailed object of the invention to provide a user programmable clock having an event memory in which the events are stored in time sequential order irrespective of the day of the week. It is a further object in that same regard to include day of week data in each programmed event and to provide the clock with means for comparing that data with the actual day of the week before executing the event.

A further object is to provide a programmable clock in which events can be entered in any sequence, but are sorted into a display memory in time sequential order. In addition, an object is to provide means for calling up and editing any of the so-stored events.

Other objects and advantages will become apparent upon consideration of the following detailed description when taken in conjunction with the drawings in which:

FIG. 1 is a view illustrating the front panel of a programmable clock exemplifying the present invention;

FIGS. *2a* and *2b* form a circuit diagram, partly schematic and partly block, illustrating the circuit of the programmable clock of FIG. 1;

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
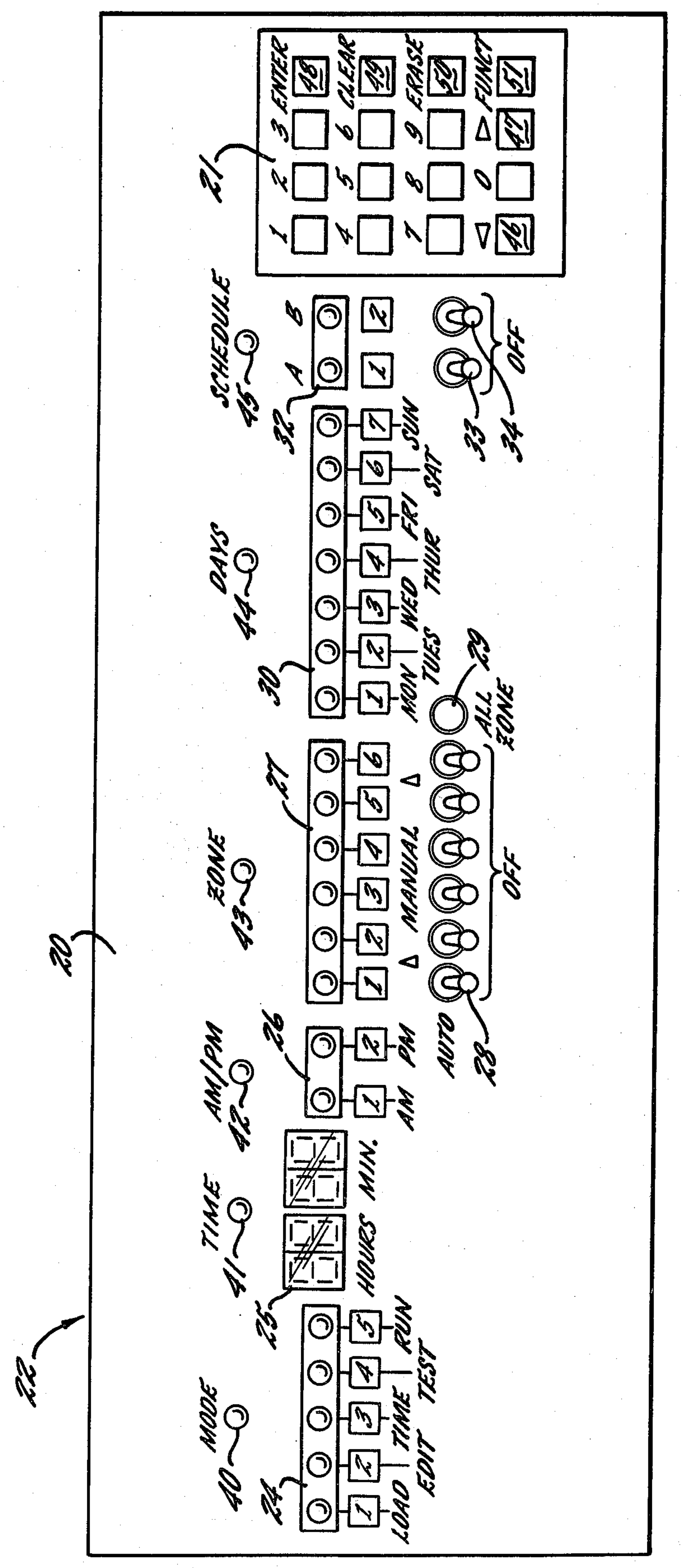

Turning now to the drawings, FIG. 1 shows the front panel of the programmable clock 20 whose most prominent features are a keypad 21 and a display generally indicated at 22. The display is divided into functional blocks with individual blocks relating to associated features of the clock. The leftmost functional block is the mode block 24 which has a plurality of LED indicators corresponding to the various modes of the exemplary clock, namely, load, edit, time, test and run. As will become apparent, in the load mode the user has the capability to program new events into the system. (As used herein, an "event" relates to one or more functions to be performed on one or more days at a specified time, and "executing the event" means performing those functions at the programmed time.) The edit mode allows the programmed events to be reviewed in sequence and edited, or erased, if desired. The time mode is available for setting the actual time which is thereafter updated by circuitry internal to the clock. The test mode is provided to sequentially execute the events in a programmed schedule on command. In effect, it is like an aspect of the run mode but where real time is compressed by executing the next scheduled event upon depression of a pushbutton. The run mode is the normal mode of the system where events are executed at their programmed time.

Following mode, the next sequential display functional block is the time section 25 which includes four digital display units. In the illustrated embodiment, time is displayed in increments from 01:00 through 12:59, with AM or PM being displayed by a pair of indicators 26. Alternatively a twenty-four hour clock can be used, displaying time from 00:00 through 23:59.

In practicing the invention, a zone functional block 27 is provided having a plurality of individual indicators, separately controllable, for selecting any combination of zones for a particular event. Typically, in a school environment zones are characterized as different areas of the school premises which are on different schedules. Associated with the zone indicators are a plurality of toggle switches 28 and a master pushbutton 29. The toggle switches 28 are provided to allow manual control of the bells in the individual zones. In the uppermost position each switch causes the bell in the associated zone to ring. In the down position (shown in the drawings) the bell in the associated zone is disabled, even if a programmed event occurs. In the center position, termed automatic, the bell in the associated zone will ring under program control as determined by the programmed events in the clock. The master pushbutton 29 is provided to ring all bells at the same time, and the bells will continue to ring for the length of time the pushbutton is depressed.

Also important in practicing the invention is the days display 30 which provides an LED indicator for each day of the week. As will be demonstrated below, the days can be selected in any combination such that a programmed event in the illustrated clock actually comprises what normal systems would consider to be a plurality of programmed events. That is, a single event can be executed on various days of the week by means of only a single programmed event instruction.

To the right of the days functional position 30 is schedule functional position 32 which, in the illustrated embodiment, has two positions A and B. As will become more apparent, the schedule information forms part of the data of an event word and distinguishes events dependent upon whether they are programmed for the A or B schedule. Typically the A schedule is regarded as normal, and all normal events are programmed for execution as "A" events. The events which are programmed only for the B schedule will be skipped when the clock is operating normally on the A schedule. Similarly, when in the B mode, only the B events will be executed while the A events will be skipped. This is a useful feature in schools where the normal schedule can be programmed as A events and unusual schedules, such as assembly days, can be programmed as B events. It is simply then a matter of selecting the appropriate mode using toggle switches 33, 34 to choose the desired schedule.

In practicing the invention, associated with each of the functional positions just described is a pointer or indicator, the pointer being implemented herein as a plurality of LED indicators 40-45. Only one of the pointer positions can be illuminated at any given time, and an illuminated pointer in a functional block indicates the active block for which the internal central processor will respond if an appropriate key on the keypad 21 is depressed. The significance of that feature in the various modes will become apparent from a functional description of system operation.

Looking first to the keypad 21, it is seen that there are a plurality of numerical keys 1 through 9 and 0 and a further plurality of special keys. Means for repositioning the pointer are provided shown herein as a pair of cursor control or arrow keys 46, 47. Depression of one of the keys causes the pointer to step in the direction associated with the arrow thereon. It is in this way that the pointer can be manually moved by the user to enter desired information into an event. The row of keys on the keypad at the right side thereof include an enter key 48 for entering an event, that is transferring information previously set on the display 20 into the display memory. A clear key 49 is provided to clear data entered into a functional zone. An erase key 50 is provided usable in the edit mode to eliminate an entire event. A function key 51 is provided having a number of uses, one of which is to lock and unlock the keyboard.

In practicing the invention, the elements so far described, in addition to performing the functions attributed thereto above, provide further guidance to the user in the form of error messages distinguishing between the various types of possible errors. Without distinguishing between all of the error types at this time, suffice it to say that if an improper entry is attempted, an audible signal will be generated indicating that fact, and the time display 25 will be driven to display one of a plurality of error messages, so as to make clear to the operator the act which caused the error. As will become apparent after the detailed system description to follow, this feature is particularly valuable in the type of programmable clock illustrated here, because the user is then given an immediate visual indication in response to each and every keystroke. Any valid keystroke will be acknowledged by lighting of an expected LED display of an expected number, the expected movement of the pointer, or the like. Any invalid keystroke will be "acknowledged" by display of an appropriate error message. The system will not allow the user to move on to another event until he makes a valid entry. This is to be contrasted with more conventional systems, and helps to simplify the user and programming tasks to the extent that minimum training and technical skill is required of the user.

A comprehensive understanding of all system functions will be easily derived from a description of the program structure to follow. However, to put that description in perspective, a few of the more common functions of the clock will first be described from the viewpoint of accomplishing those functions using the indicators and keypad on the front panel.

When the clock is first installed and power is first applied, operation is initiated in the load mode, that is with the load indicator within the functional group 24 glowing and the pointer positioned at time 41. At any other time, should it be desired to return to the load mode, it is simply necessary to position the pointer at the mode location 40 by use of the pushbutton 46, then to depress the pushbutton 1 which as seen in the functional group 24 is associated with the load indicator.

In the load mode, with the pointer at the time location, the numerical keys corresponding to the time of the desired event are depressed, and the corresponding numerals illuminated in the display 25. After the last digit is entered, the pointer automatically shifts to the AM/PM position. If, for example, it is desired to enter a morning event, and AM is already displayed, one need only depress the right cursor key 47. Alternatively, the 1 or 2 key on the keypad 21 are used to select AM or PM respectively. In any event, depression of one of the keys will cause the associated LED to be illuminated and will automatically shift the pointer to the zone location. The zones in which the bells are to ring are determined and entered by depressing pushbuttons corresponding to the associated zone LED's. When all of the desired LED's are illuminated, a single depression of the right arrow key 47 will cause the pointer to switch to the days position 44.

In similar fashion, the numerical pushbuttons corresponding to the day LED's are depressed to select the days of the week on which the event is to occur. When all of the desired days are entered, a depression of the right cursor 47 moves the pointer to the schedule position 45. Either A, B, or both schedules can be selected by depression of the 1,2, or both of such pushbuttons. It is noted that if the schedule LED's had been illuminated at the termination on the days entry, it would not be necessary to enter the schedule functional block. After checking the visual display to determine that the displayed event information is correct, the user then depresses the enter pushbutton 48, causing all of the event data to be entered into a display memory in a manner which will be described in greater detail below. In addition, depression of the enter button causes the pointer to return to the time location 25 for facilitating entry of the next event.

The edit mode is provided to make revisions or deletions in a previously loaded event program. To enter the edit mode one uses the cursor key 46 to move the pointer to the mode location 40 whereupon depression of the 2 button illuminates the edit LED and causes the system to enter the edit mode. When such mode is first entered, the first event in the display memory is extracted and displayed on the front panel indicator 22. That includes the programmed time information, zone information, AM/PM, days and schedule. Subsequent depressions of the 2 button causes subsequent events to be displayed. If it desired to change one of the entries, the entry is first caused to be displayed whereupon the arrow pushbuttons are used to move the programming pointer to the function position to be changed. New data is then entered just as in the load mode using the numerical pushbuttons. The old data is automatically cleared at that point. When the new data is entered and checked, depression of the enter pushbutton causes the data in the display memory to be corrected and returns the programming pointer to the mode position. If it is desired to completely eliminate an event, the event is first displayed whereupon the erase pushbutton 50 is depressed, completely eliminating that entry from the display memory.

In order to set the time, the time mode is entered by first using the arrow pushbutton 46 to illuminate the mode pointer, then depressing the 3 pushbutton in the keypad which illuminates the time LED in the functional block 24. The time of day is noted and the keyboard is used to enter a time one minute later than the actual time. Hours and minutes are entered by depressing the keys in the keypad 21. After four digits are entered in the time zone, the pointer switches to the location 42 and the keypad is utilized as before to enter AM or PM. The pointer then automatically switches to the days position 44 and the keypad is utilized to enter the current day of the week. At exactly zero seconds, the user then depresses the enter pushbutton which causes the displayed time to be entered into an internal register which thereafter maintains the current time of day. In addition, the pointer automatically returns to the mode position, the run mode indicator is illuminated and the time mode indicator is extinguished.

With the system completely programmed and when it is desired to simply walk away from the system, leaving it in the run mode to continue to control schedules within the school, it is very desirable to be able to lock the keyboard such that unauthorized tampering is unlikely to occur. Rather than utilizing a physical key and lock, the illustrated programmable clock uses a special electronic code for locking and unlocking the keyboard. In order to lock the keyboard, it is necessary to simultaneously depress the function and clear pushbuttons, the result is that the pointer will be extinguished, and the only display will be the current time of day. Depressing of any of the pushbuttons will be ineffective to alter the information within the programmable clock. In order to unlock the keyboard, it is necessary to simultaneously depress the function and enter keys, which illuminates the pointer in the mode position 40, illuminates the run indicator within the functional section 24 and displays the current time of day.

Figure 2A:
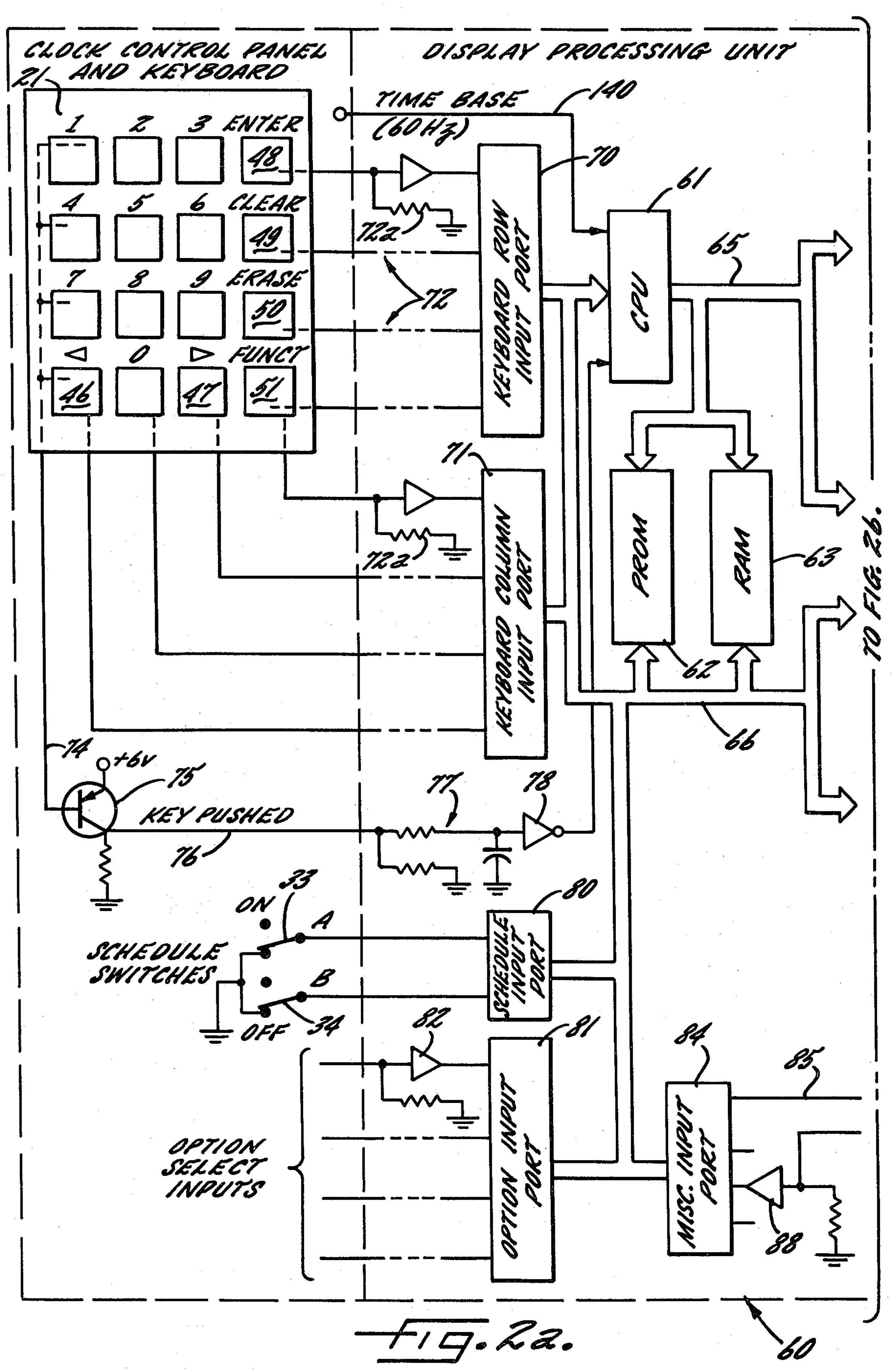
Figure 2B:
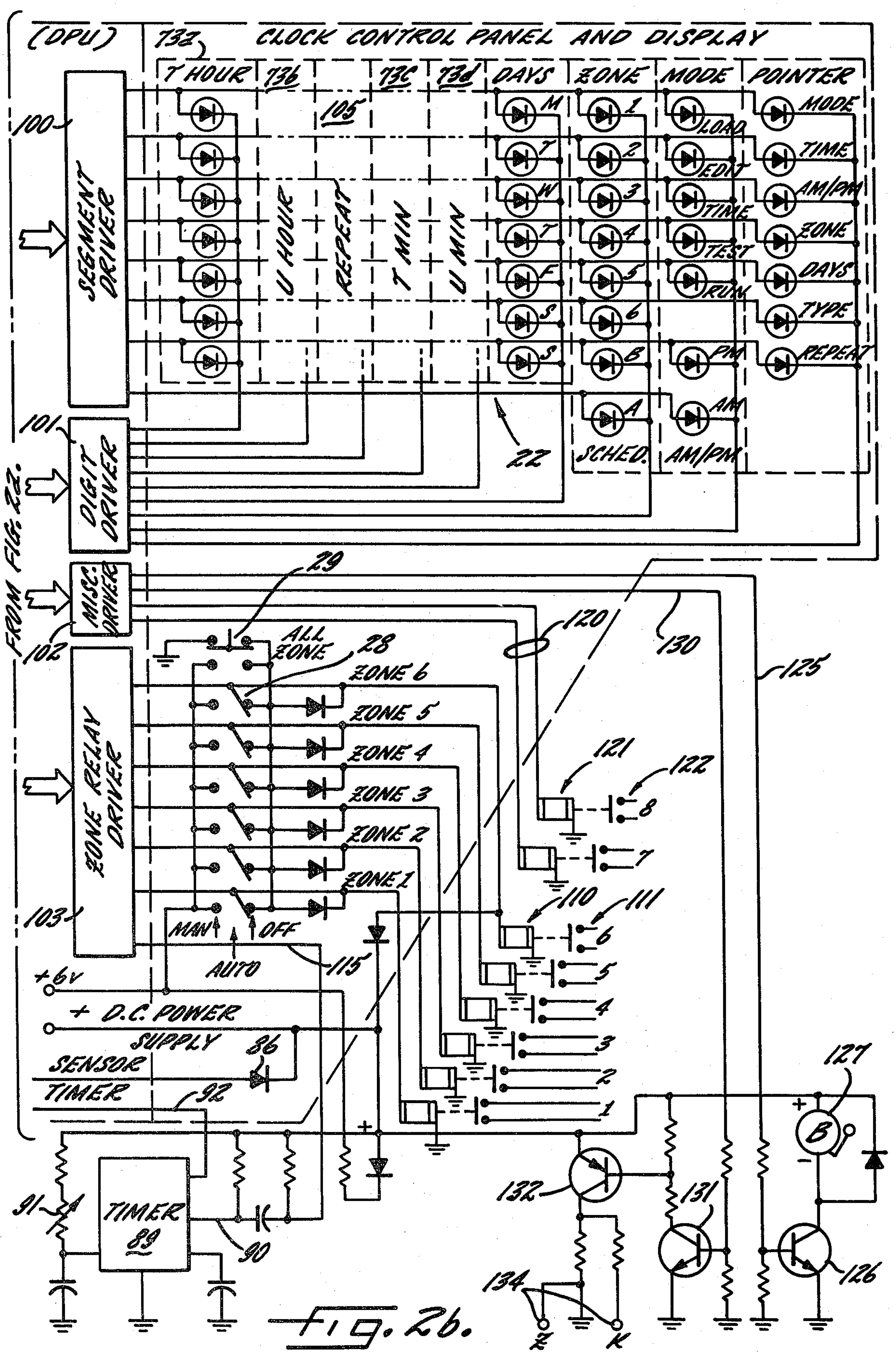

Turning now to FIGS. 2*a* and 2*b*, there is shown the circuitry which operates to perform the functions described above. A display processing unit 60 is provided to perform the main control function. Within the processing unit is a microprocessor, in the illustrated embodiment the commercially available RCA 1802 microprocessor. As will be apparent to those skilled in the art, the figure illustrates the important subelements of the 1802 microprocessor, including a central processing unit 61, associated program memory in the form of PROM 62 and read/write memory RAM 63. A portion of the RAM 63 includes the display memory in which programmed events are stored and from which programmed events are retrieved for execution. In conventional fashion, emanating from the central processing unit 61 is a memory address bus 65. The CPU also has a bi-directional data bus 66 connected to the memory 62, 63 as well as to input and output circuitry.

The commercially available 1802 processor used in the exemplary embodiment has a plurality of selectable input and output ports, which in the drawings, are illustrated schematically as blocks. Looking first to the keyboard row and column input ports 70, 71, respectively, it is seen that their inputs are connected through buffers generally indicated at 72 to the rows and columns of the keypad 21. A keyboard common line 74 is connected to the base of a transistor 75, whose collector is connected through buffer 77 and inverter 78 to CPU 61. The pull down resistors **72*a* associated with the buffers 72 provide a ground return switchable through the keyboard for turning on the transistor 75. When any one of the keys is depressed, the row and column which intersect at the key are both connected to the common line 74, completing a path for base current from the transistor 75, turning it on. As a result, the row and column outputs of the pressed key are brought positive, buffered and applied to the input ports 70, 71, identifying to the CPU 61 which of the keys had been depressed. In addition, the high signal on the collector of transistor 75, buffered at 77 and inverted at 78, results in a low going signal to the CPU 61, intended to set a flag indicating that a key has been depressed. In response thereto, the processor activates the particular input ports associated with the blocks 70, 71** to decode which of the keys had been depressed.

Among the other input ports are a schedule input port 80 connected to the schedule toggle switches 33, 34, which is sensed by the processor under program control to determine which of the two schedules should be executed. An expansion or option input port 81 is provided having buffers 82 similar to the buffers 72, the input to the buffers being available to select other options not necessary to an understanding of the present invention. Finally, a miscellaneous input port 84 has its inputs connected to receive certain additional information. For example, a power supply sensor 85 connected through an isolating diode 86 to the main DC power source, monitors the presence of DC. If the AC power fails, the DC power disappears which results in a signal on line 85 ultimately input to the CPU via the input port 84. The CPU responds by going into a low power mode which continues to monitor time but suspends all other functions. A backup battery is provided capable of keeping the system operating for at least three days under such conditions. A further input to the miscellaneous input port 84 is via a buffer 88 from a timer 89. The timer 89 can be a conventional NE 555 with associated components. The timer is triggered from a line 90 which, as will be described below, is driven from the CPU via one of its output ports. Suffice it to say for the moment that the timer is triggered whenever execution of an event is initiated. The time has an adjustable period settable by potentiometer 91 and is used to establish the length of time during which the bells will ring. The length can be variable between two and ten seconds. At the termination of the timed interval, the timer output on line 92 switches low, such low signal being buffered by the aforementioned buffer 88 and applied to the input port 84 for sensing by the central processor. When the central processor determines, by sensing the input port 84, that the timer had switched from an on to an off condition, it terminates the execution of the event.

Turning now to the output related elements, there are shown a plurality of output ports 100–103. The ports 100–103, for simplicity are shown as rectangles, with the understanding that such rectangles include conventional latches and driver circuitry normally found in this environment. The ports 100 and 101 are driven from the memory bus 65 and are used to control the indicators on the display 22. The seven segment display digits for the time display 73 are shown as digits **73*a*–73*d*. The segment driver 100 drives respective anodes in the seven bar display whereas the cathodes of the individual displays are driven by respective lines of the digit driver 101**. Accordingly, the digits are strobed in conventional fashion to illuminate the segments which form the displayed digits.

It is worthy of note that the segments are driven directly from the CPU output word rather than being decoded by circuitry external to the display processing unit. In that way, in addition to displaying the conventional digits 0 through 9, the seven segment displays **73*a*–73*d* can be used to display error messages. We prefer to drive the first digit to illuminate all but the two righthand vertical segments to form an "E", the second and third digits with only the left lower vertical and central horizontal segments illuminated to form "rr" and the final digit with a number identifying the particular error. The display looks the Err X where X is a number distinguishing the error type. FIG. 2*b* shows a further optional display 105 identified as "repeat". This can be provided as a special option where an event is to be executed twice, the respective executions separated by a predetermined time interval. The repeat display 105** is provided to display to the user, and allow the user to select the length of the delay.

The output ports 102, 103 are driven from the data bus 66 and, among other functions, are used to control the actual execution of the event. In the illustrated embodiment, such control is accomplished by energizing one or more of a plurality of relays generally indicated at 110 to close associated contacts generally indicated at 111 for control of external circuitry, in the school environment control of bells.

In the exemplary embodiment six individual zones are provided, such zones being driven by the output port 103, through the toggle switches 28, through conventional drivers (not shown) to the relay coils 110. At the time one or more of the output lines of the zone relay driver 103 are driven active, the output line 115 is also driven low to trigger the timer 89. Thus, initiation of the timed interval begins with activation of the relays which control the associated bells.

The miscellaneous driver 102 has a number of functions, among which are outputting signals to synchronize secondary clocks. To that end, the driver 102 has a pair of output lines 120 driving associated relays 121 having contacts 122. Depending on the type of synchronous clock to be corrected, the relay is closed for a predetermined number of seconds at a predetermined point in time to energize a winding in the clock causing the hands to move to a predetermined reference position. The driver 102 is also shown driving an output line 125 adapted to turn on a transistor 126 which in turn will sound a buzzer 127 connected in its load circuit. While the circuit connection is simplified for ease of understanding, the CPU produces a signal which is processed to provide a power output to turn on the transistor and sound the buzzer whenever the processor detects that an erroneous entry has been made on the keyboard. In addition to energizing the transistor 126 to sound the buzzer, the processor also produces a display on the digit display 73 to indicate the nature of the error. Finally, a line 130 emanates from the miscellaneous driver 102, and when energized, turns on a transistor 131 which in turn turns on a transistor 132 to produce a signal across a pair of terminals 134. This signal can be used for a number of purposes, and is included herein simply to illustrate that the clock can produce output signals of whatever type desired to control appropriate circuitry on a programmed schedule.

Figure 3:
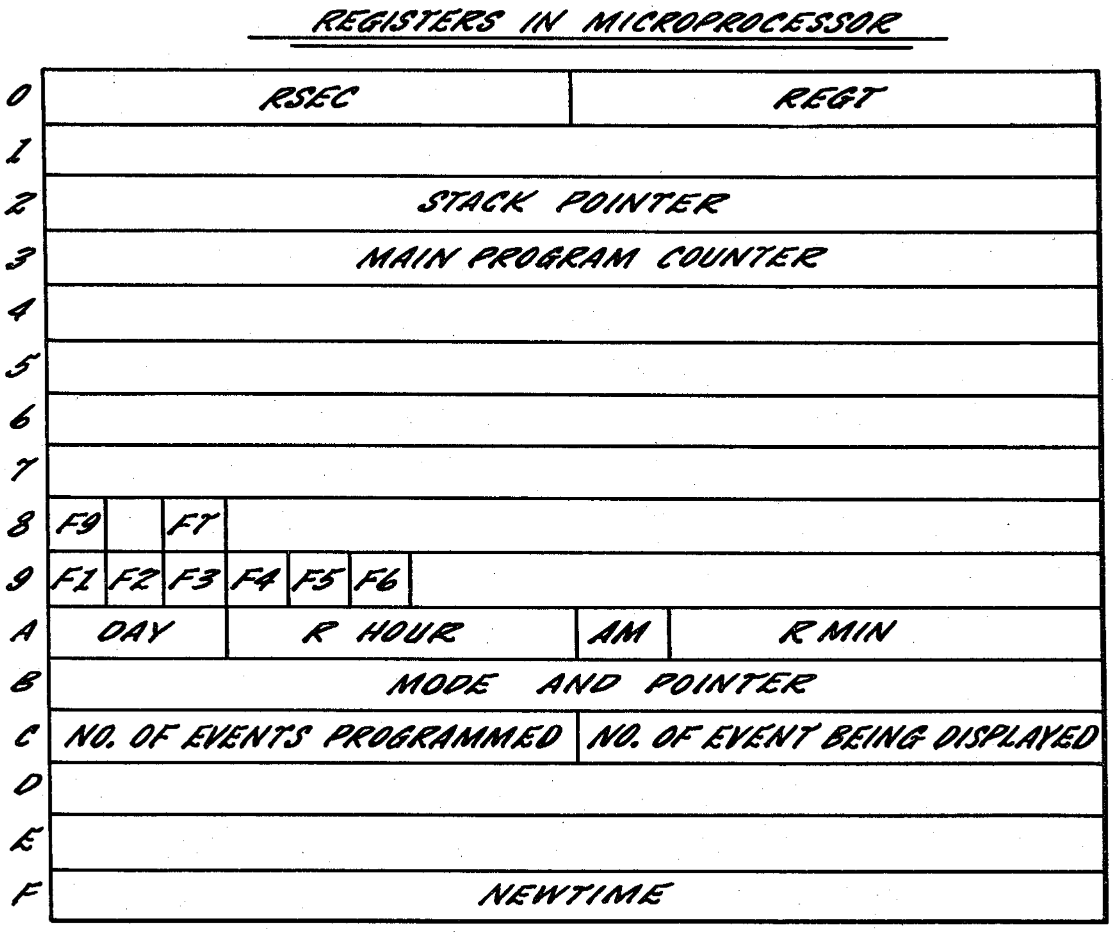
FIG. 3 is a diagram which schematically illustrates the register structure of the microprocessor of the programmable clock.

FIG. 3 schematically illustrates the register structure within the exemplary 1802 microprocessor, which has associated therewith sixteen registers, each sixteen bits wide. It is noted that a number of registers in the processor have functions which are not necessary for an understanding of the present invention, and those registers such as the 1 register will not be described herein. The uppermost eight bits of the 0 register designated RSEC store the seconds portion of the current time data. The lowermost eight bits designated REGT are incremented by the 60 Hz power line, by means of hardware, without the use of processor instruction in order to maintain a count of time. Digressing to FIG. 2, there is shown a time base input 140 (derived from the 60 Hz power line) connected to the CPU to increment the REGT register.

In the RCA 1802, the signal on line 140 can be used to request a DMA cycle which automatically results in incrementing the 0 register which stores REGT. When the number stored in REGT reaches 60, that is, after a full second has elapsed, the processor increments the RSEC portion to advance the number of seconds by one and resets REGT to zero to count the next second. When the RSEC register fills to the count of 60, indicating that a minute has passed, the processor zeros the RSEC register and increments the RMIN register (location A) by one. In similar fashion, the RMIN register at 60 increments the RHOUR register, the RHOUR register at 12 increments the AM/PM bit, and when changing from PM to AM, the AM/PM bit increments the days register. In that fashion the register structure is continually updated to monitor the current time of day and day of week.

The 2 and 3 registers are common to most computer systems, comprising a stack pointer and a main program counter necessary for the housekeeping functions of the processor. The 8 and 9 registers are used to store flag information whose significance will be better appreciated from the following program structure description.

For purposes of driving the mode and pointer elements of the display 22, the B register contains information which illuminates the associated indicators under the control of the processor. The C register stores two elements of information, particularly the number of events which are then programmed, and the number of the event which is then being displayed. Stored events in the processor memory are arranged sequentially by time (irrespective of day). Accordingly, the information in the lowermost bits of register C, that is the number of the event being displayed is useful in retrieving the next event once the displayed event is executed. The system has the ability to display the number of events programmed, and the uppermost bits of register C are useful in accomplishing that. The F register within the register structure stores data designated NEWTIME. This register is useful in the time mode where the keyboard is used to enter the time of day and day of week, but that information is not entered into the actual time register in location A until the enter key is depressed. As noted above, the operator waits until real time reaches the exact time set on the clock (and thus stored in NEWTIME) before hitting the enter key whereby the processor transfers the data from location F to location A where it is continually updated by the process described above.

Figure 4:
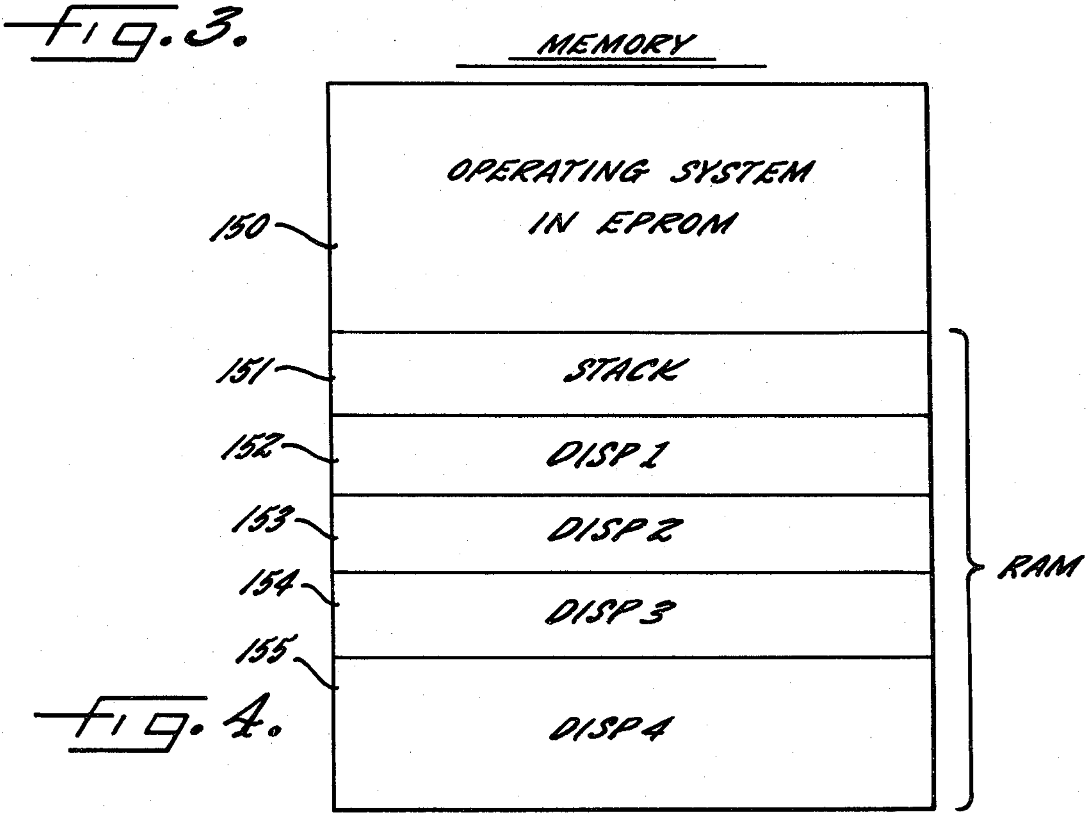
FIG. 4 is a diagram schematically illustrating the memory organization associated with the microprocessor; and FIGS. *5a–5g* are flow charts describing the structure of the program associated with the microprocessor.

Turning now to FIG. 4, there is schematically illustrated the general memory organization, more particularly the organization of information within the PROM 62 and RAM 63 associated with the central processor unit 61, and the manner in which it is accessed by the memory bus 65. The lowest order addresses are used to address the operating system which is resident in the PROM 62. This is the basic program which contains the basic, unchanging set of instructions to be executed by the system. The remainder of the memory is in RAM 63, the next order of which is the stack 151 comprising a group of locations for temporary storage of data, such as addresses to which return is desired after execution of a jump instruction. Particular locations within the stack 151 are accessed using the stack pointer which is register 2 in the register array of FIG. 3.

The remaining portion of the RAM includes four display areas 152–155. The DISP 1 and DISP 2 areas 152, 153 are similar, containing multiple data words for storing data in display (as opposed to storage) format. More particularly, the data bits are stored in DISP 1 and DISP 2 such that they can be transmitted directely to the output ports 100–103 of FIG. **2*b* without decoding to drive the display, the zone relays and the other output circuitry. Normally the DISP 1 area 152 is utilized for storage of event information whereas the DISP 2 area 152 is utilized for storage of real time information. Accordingly, both types of information are readily available to the system for display upon demand. The DISP 3 area 154 is utilized for temporary storage of data relating to the event being displayed. By way of contrast with the data format of DISP 1, the data in the area 153 is encoded in storage format to minimize the number of bits required, and utilizes only a single data word. The code used for storage in the DISP 3 area 154 is the same as that used in DISP 4 155**, which is the major display area capable of holding, for example, 114 events.

In the case where 114 events are stored within the area 155, there are available 114 word locations, one word for each event. As will become more apparent, the words are stored in the DISP 4 area in sequential locations beginning with the first, and with the events arranged in time sequential order, irrespective of day. If an intermediate entry is erased, means are provided for moving the others up so that they remain in sequential locations. If an intermediate event is entered, the system operates to "make room" for that event in its time ordered location, in order to retain the time sequential order.

To illustrate the transfer of data between the display areas, if it is desired to display an event which is stored within the DISP 4, the event is transferred without code translation from DISP 4 to DISP 3. Thereafter the information in DISP 3 is decoded and the decoded information stored in DISP 1. The format of DISP 1 is such that the processor has access to the event data in a format which corresponds to the output structure so that the processor need simply transfer the data to the output port without performing any code conversion.

An important aspect of the structure of the present programmable clock is the structure of the program memories which combine with the user interface elements of the front panel of FIG. 1 to comprise means for performing many of the functions described thus far. In order to disclose the program structure, reference will be made to FIGS. **5*a*–5*g* which demonstrate the flow of program steps under control of the memory 62**.

Turning then to FIG. **5*a*, the description of system structure will commence from the moment the unit is first powered up. As a first step, when power is applied to the unit, an operation 201** is performed to initialize all the registers in the system and clear the RAM. With that step accomplished, the RAM is completely cleared and the registers set to desired initial conditions which cause the entry to the appropriate step in the operating system to render the clock ready for service.

Following RAM and register initialization, the next step 202 is performed to initialize the event in DISP 3, decode it, and store the decoded display information in DISP 1. The purpose of this step is to initialize the DISP 3 area to contain convenient data in certain locations and to clear other areas. As will become more apparent, the DISP 3 area is that which is written under the control of the user as an event is being compiled before entry. Thus, to aid the user, when the system is first powered up, the system can be initialized by setting the time to 8:00 AM selecting all zones, all days and Schedule A. The function 202 also serves to initialize the time register (register A of the register complex of FIG. 3), decode the initialized information and store the decoded display information in DISP 2. In this exemplary embodiment time is initialized at 9:00 AM, Monday.

Following initialization, the system enters one of its repetitive loops designed to continuously update the current time of day. A description of the manner in which the current time is initially set will follow at an appropriate point in the description of program flow. However, assuming the system has been initialized and is operating, the manner in which time is counted will now be described.

Program step 203 is called to test the lower bits of register 0 which contain the REGT information, to determine if the contents are greater than or equal to 60. If they are not, the program exits the time counting loop and proceeds to a further major loop identified by junction B, which is concerned with detection of actuated pushbuttons and response thereto. Assuming the contents of REGT were greater than or equal to 60, the program progresses to the step 205, which causes the magnitude 60 to be subtracted from REGT and the remainder reloaded into REGT. This step is to account for the fact that REGT might have been incremented past 60 while the program was cycling in another portion of its loop, so as to prevent the loss of one or more cycles of the 60 Hz clock which would tend to make the time inaccurate.

Leaving the step 205, REGT is now in a condition to count the time signal to detect passage of the next second. The step 206 increments the RSEC portion of register 0 by one, thereby accounting for the subtraction of 60 Hz from REGT. A series of tests 207, 208, 209 are accomplished which deal with sending of correcting pulses to self-correcting clocks. Assuming the count maintained within the RSEC portion of register 0 is not 2, is not 8, and is not 54, a test is then made at step 210 to determine if the count is 60. If it is not, the program returns to junction B to again test if any keys have been depressed. On the occasion when the count within RSEC is 60, a step 211 is accomplished to load 0 into the RSEC protion of register 0. In addition, RMIN within register A is increased by 1 by operation 212, such that the minutes are incremented while the seconds return to zero to count up again. A further test is then performed at step 213 to determine if RMIN is equal to 60. Assuming it is not, then the hours portion of the real time remain unchanged, while the minutes portion has changed. Accordingly, it is necessary to update the real time information in the DISP 2 so that the information available for display is current. Accordingly, a step 214 is performed to decode the time from register A into DISP 2. This involves not simply a translation of the data but a decoding to put that data in format directly suitable for display. Assuming the test mode test at 215 and the run mode test at 216 are negative, the program returns to junction B to determine if any keys have been depressed.

Returning to the test at 213, if the count within the RMIN portion of the A register is 60, the steps 217 and 218 are called to put zero into RMIN and to increase RHOUR by one. Thus the minutes and hours portion of the register A have been updated. If test 219 determines that RHOUR is not 12, a test **219*a* is made to see if it is 13. If not, the step 214 is again called to decode the information from the A register into DISP 2. If, on the other hand, the number within RHOUR is equal to 12, then the AM/PM bit in the A register is inverted in order to change AM to PM or PM to AM. If RHOUR is 13**, it is changed to 1.

The AM/PM bit in the register is then tested at step **219*b* and, if it is determined that the bit is now indicating PM, the time in DISP 2 will be updated by the loop beginning with the step 214 as previously described. However, if it is determined that the bit is in the AM condition, then the step 220 will be executed, to cause a switch in the uppermost bits of the A register in order to change the day in that register to the next day of the week. At that point, all possible changes in the time register have been made and the program returns to step 214 to update the information in DISP 2** to match that in the register A.

Figure 5A:
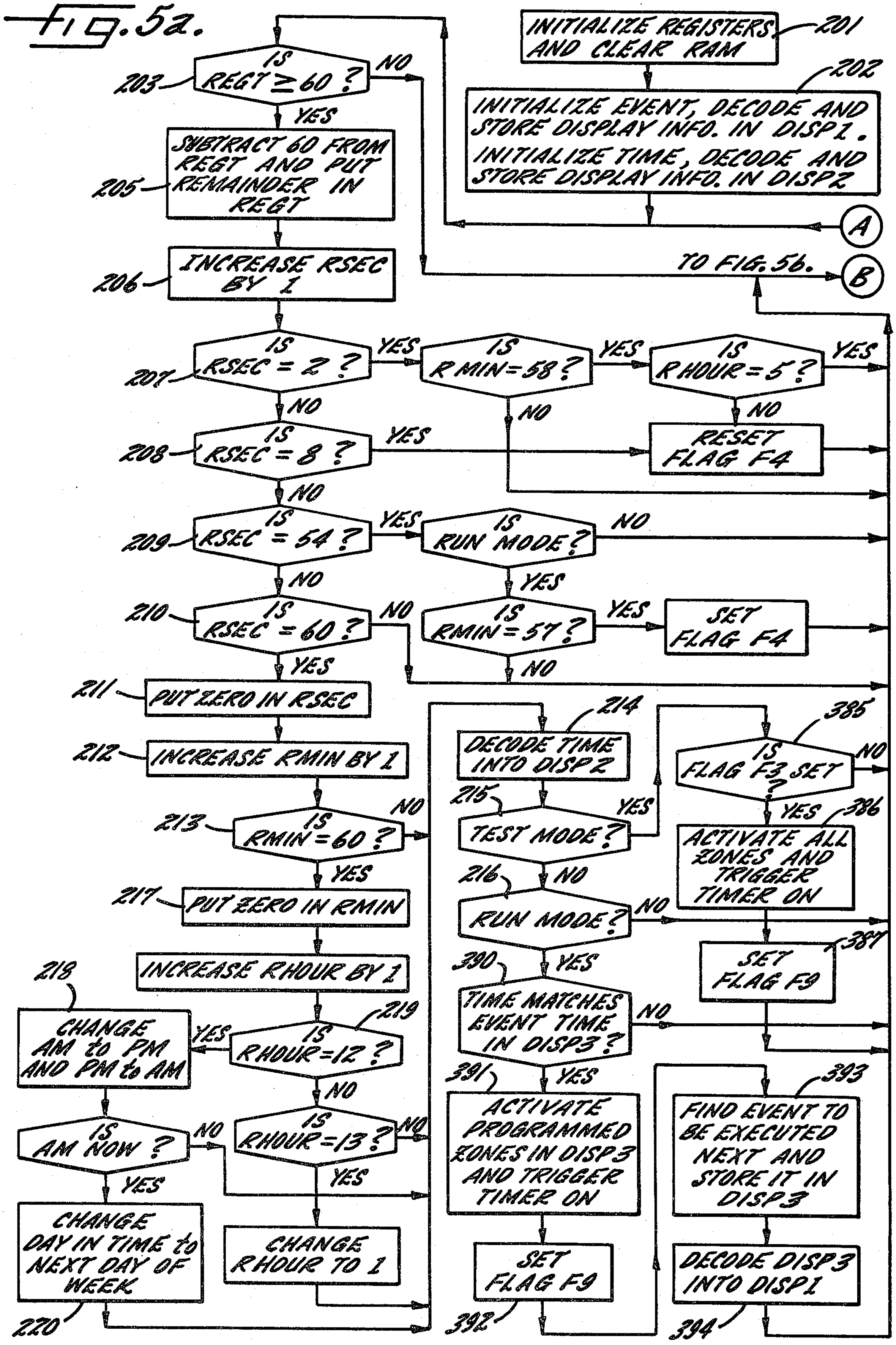

When entering the program junction or node designated B, a first test is performed at 221 (FIG. **5*b*) to determine if AC power is on. If it is, operation proceeds as normal. However, if power has failed, a step 222 is performed to limit system functions until power is restored. The pointer is moved to mode and an operation is performed to select the run mode. The time register A is decoded and stored in DISP 2 and DISP 2 bytes are passed to the visual display by a step performed at 223. The microprocessor, having lost its 60 Hz timing input then uses its own crystal controlled clock to keep track of the time. It institutes a delay of 16.67 milliseconds following which, the next cycle of the 60 Hz wave should have been received. However, since the power has failed and that is not possible, the processor then itself at step 225 increments REGT to simulate the 60 Hz input. The program then returns to point A at FIG. 5*a* to test the REGT portion of register 0** in the manner described above.

Assuming that the system is operating normally, and the test performed at 221 is positive, a test 226 is then performed to determine if a key is pushed. The test is performed by sensing the signal produced by the transistor 75 (FIG. **2*a*) which signal is inverted and coupled to one of the flags normally used by the 1802 processor to derive status information from peripheral devices. Assuming first that no key is pushed, the loop which is entered as a result of a negative decision at test 226 is performed, but without effect at this initial stage of operation. However, if a key is depressed, the test 226 branches to test 227 to determine if flag F1 is set. Flag F1 is the flag which is set after a keystroke is initially detected and is used as a means to prevent a single keystroke from being detected as two separate strokes. Since we are dealing with the first time the key in question has been pushed, the flag is not set so an operation 228 is called to set the flag. A test is performed at 229 to determine if the keyboard is locked. If the keyboard is not locked, a further test is performed at 230 to determine if the function key and clear key are pushed simultaneously, a key combination which causes the locking of the keyboard. However, since that is not the case here, the program branches to node E which continues at the upper left portion of FIG. 5*c***.

The processor, having tested the key pushed signal produced by transistor 75, knows a key has been depressed, and must now determine which of those keys has been pushed. That is accomplished by a step 232 which causes the sensing of the input ports 70, 71 (FIG. **2*a*) to decode the eight input lines, and determine from that information which key has been depressed. A test is performed at 233 to determine if the detected key value matches one of the sixteen available keys. Assuming that the user has properly depressed the selected key, the test 233 will be positive, which causes a branch to the test 234 to determine if one of the numbered keys in the keypad was the one depressed. Assuming we have just entered the load mode, the system would have been initialized with the pointer illuminating the time indicator 41 (FIG. 1). Accordingly, the user would be in the position of entering hours data, such that if he were operating properly the test 234 would be positive. The test 235, under the assumed conditions, will be negative since the pointer is on time, not mode. Thereupon the program will branch to junction K at FIG. 5***d*. The first step upon leaving that junction is test 236 which determines if the pointer is on time. In this case it is, so that a further test is performed at 237 to determine if it is the first entry in the time mode. Again the test is positive and a further test 238 is performed to determine if the numerical key is greater than or equal to 2. Since we are dealing with the first entry in the tens hours position, a proper entry will always be less than 2. Accordingly, the test result is negative which causes the operation 239 to be performed to clear the time digits in DISP 3 and also clear the NEWTIME register at location F in the processor register array. The DISP 3 area is altered primarily for use in the load mode while NEWTIME is altered primarily for use in the time mode.

Following clearing of DISP 3 and NEWTIME at step 239, an operation 240 is performed to transfer the digit just entered to the tens hours position of DISP 3 and of NEWTIME. As a result, the key stroke performed by the user has now resulted in entering data into the appropriate areas of display memory for retention by the system. A test is then performed at step 241 to determine if the system is in the time mode. If the system were in the time mode, then the NEWTIME information would be decoded into DISP 2 for the purpose of displaying the changed time which is being input. However, under the present circumstances, the test result is negative so that the program branches to junction C at FIG. 5*b*.

For the purpose of displaying the entry which the operator has just keyed, a step 242 is accomplished to decode the information in DISP 3 (which is in storage format) into DISP 1 (which is in display format). A test is performed at 243 to determine if the system is in the test or run mode. Under the assumed circumstances, the answer is negative such that the step 244 is called to display DISP 1 bytes. Accordingly, the operator now sees the tens hours of the display portion 25 illuminated with the number he has entered via the keypad. A test is then performed at 245 to determine if flag F9 is set. FIG. F9, as will become more apparent, is set when an event is being executed. Accordingly, the answer is in the negative, which causes the execution of operation 246 but that execution is always without effect when approaching the step 246 from the test 245. The program thereupon returns to major node A to determine if time needs to be incremented, to accomplish that if necessary and then to return to node B to determine if any additional activity has occurred at the keyboard.

Figure 5B:
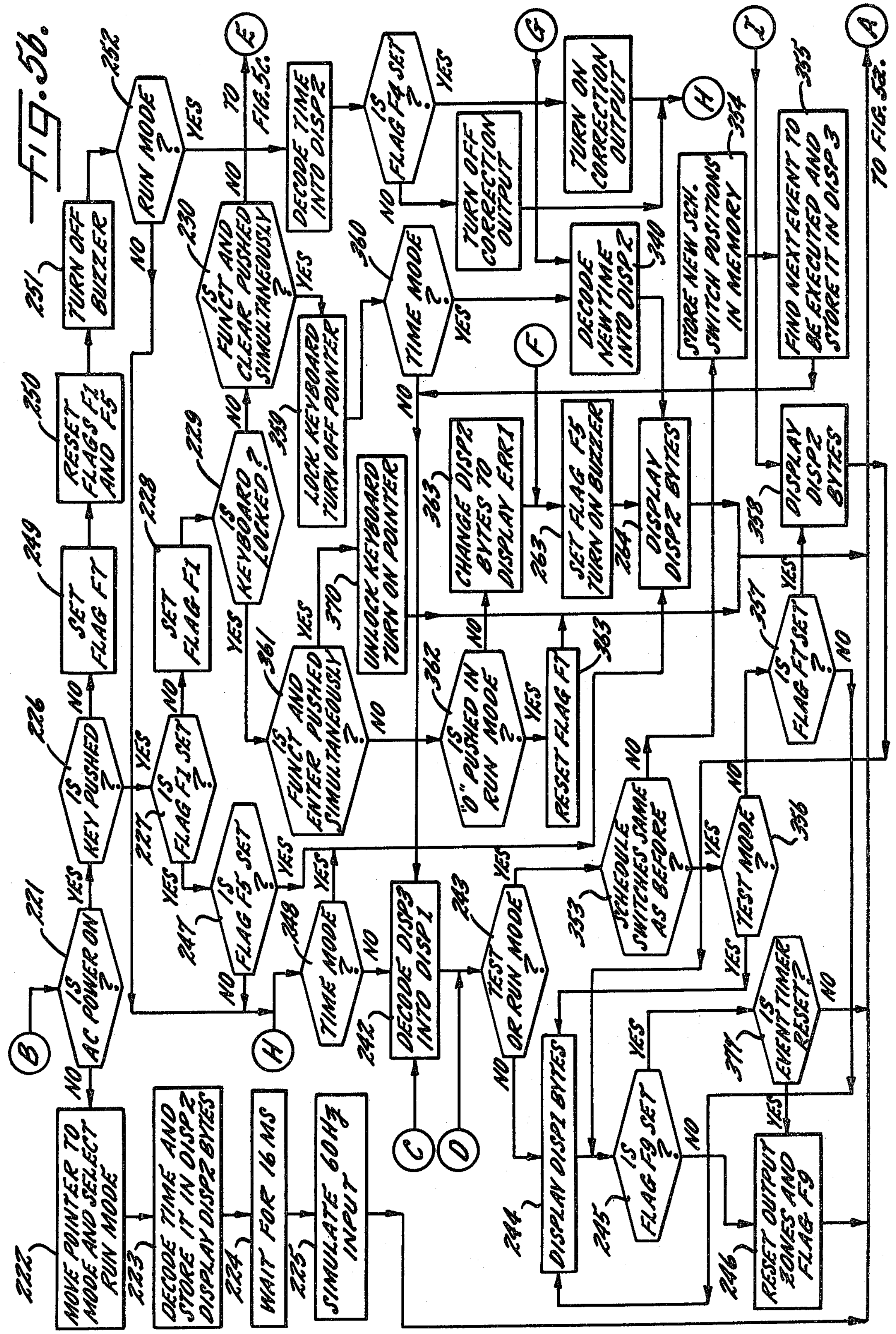
Figure 5D:
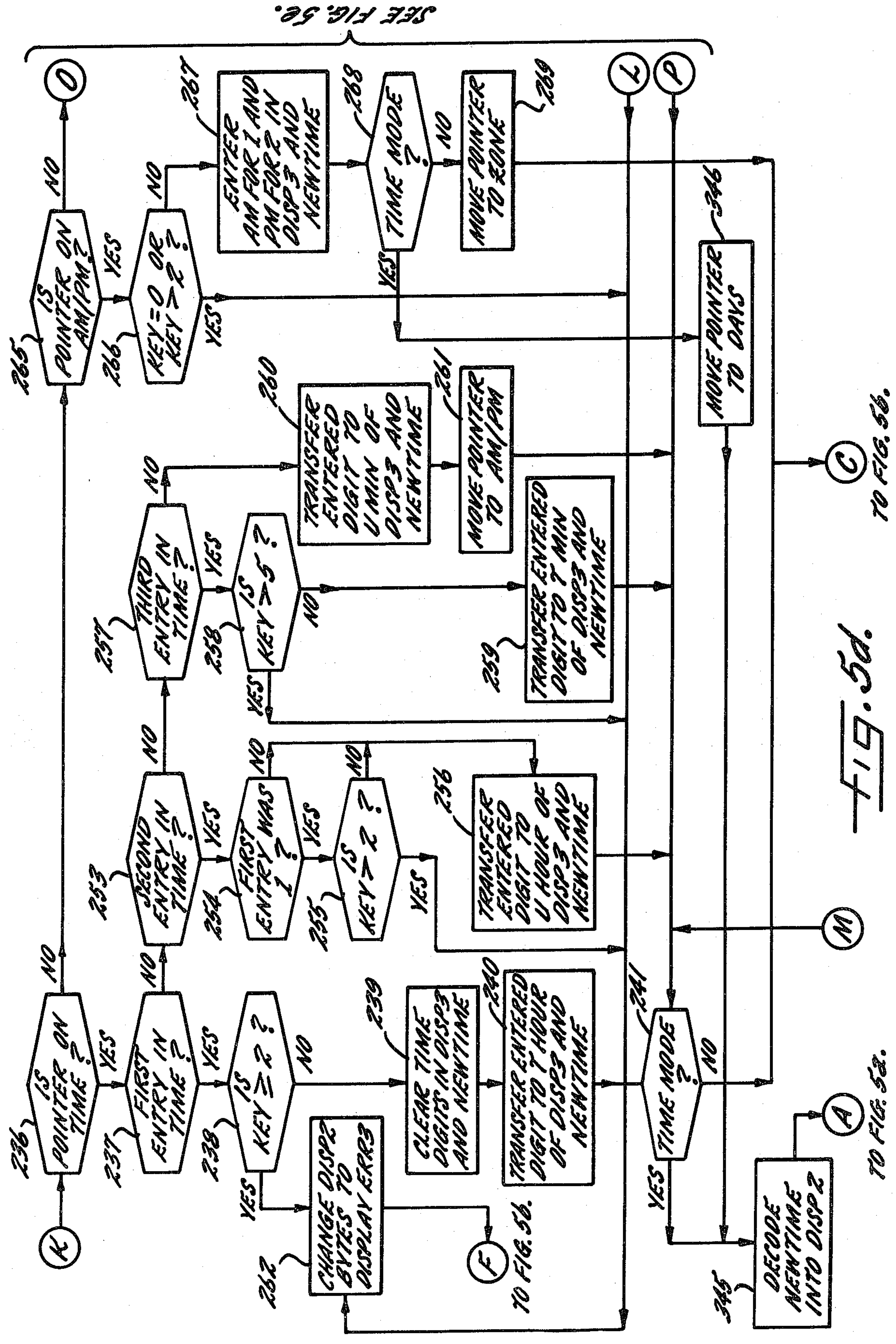

Returning to the upper left portion of FIG. 5*b*, particularly the junction B, the test 221 is performed in the normal manner, then the test 226 as described above. If the operator has not yet released the key, the test 226 again yields a positive result. Advancing to the test 227, in this condition, the flag F1 which had been set on the previous loop remains set. Accordingly, the test 227 result is positive, causing a further test at 247, to determine if flag F5 is set. Flag F5 is set when miscellaneous functions (such as error messages) are being displayed. Accordingly, at this stage of the program flag F5 is not set, and a further test is performed at 248 to determine if the system is in the time mode. Since it is in the load mode, the answer is negative whereupon the operation 242 and the subsequent steps described above are repeated to return to the junction A for time updating and ultimately to the junction B. When the operator finally releases the pushbutton the test 226 result becomes negative, causing the flag FT to be set by the operation 249. With the flag FT set in the run mode, time is displayed. In all other modes the condition of the flag has no effect. The program proceeds to the operation 250 which causes the resetting of flags F1 and F5. The buzzer turn-off step 251 is executed without effect in the present condition. A test is performed at 252 to determine if the system is in the run mode. The answer in the present case is in the negative whereupon the test 248 and subsequent steps previously described are again executed for updating of displays, display of information and return through node A, time incrementing if necessary to node B.

The system continues to loop in that fashion until the operator depresses another key which is detected by the test 226 to produce a positive result. Since flag F1 had been reset by the step 250, the test at 227 is negative causing the setting of flag F1 at step 228, the testing for the locked condition of the keyboard at 229, the test at 230 to determine that the user is not attempting to lock the keyboard. Just as described above, the inputs from the keyboard are decoded at step 232, the program determines at step 233 that the key has properly been depressed, determines at test 234 that it is a number key and determines at test 235 that the pointer is not on mode. The program enters junction K whereupon test 236 is affirmative since the pointer is still on time. Contrary to the last loop, however, the test 237 is negative because this is the second not the first entry in time. A test 253 is performed to detect that this is indeed the second entry with the pointer on time. The affirmative answer to that test calls a test 254 to determine if the first digit entered was a 1. If it was, a further invalid entry test 255 is performed to determine if the present entered digit is greater than 2. If it is not, or if the test 254 were negative, the step 256 is performed to transfer the entered digit to the units hours location of DISP 3 and NEWTIME. The system then returns to the loops described previously to determine when the key is released, to reset flag F1 upon that release and then to return to detect the next key depression. Similar loops are performed until the test 257 is encountered as a result of a third numerical keystroke. When the third entry is detected by the test 257, a test is performed at 258 to assure that the user is not attempting to input 60 or more minutes. If he is not, the operation 259 causes the transfer of the entered digit to the tens minutes location of DISP 3 and NEWTIME.

The program returns to major nodes A and B in turn to count time and to monitor keyboard activity, all as described previously. Since the third entry in time has now been made, upon detecting and decoding a fourth numerical keystroke, the test 257 result is negative, which causes the performance of the step 260 to transfer the last entered digit into the units minutes location of DISP 3 and NEWTIME. The step 261 then automatically moves the pointer to the AM/PM position.

Abandoning our user's good fortune, assume that during the course of making the four previously described entries, he attempted an illegal entry. If, for example, he attempted to enter a number of hours greater than 12 by entering a first digit greater than or equal to 2, the test 238 (FIG. 5*d*) rather than produce a negative result as described above, would produce a positive result causing a branch to operation 262. That step changes the data in DISP 2 to digital data representative of the message Err 3. Following that, the program is caused to branch to junction F near the center of FIG. 5*b*, where the first action performed at step 263 is to set the flag F5 and turn on the buzzer. It is recalled that a buzzer 127 was described in connection with FIG. 2*b*, to be sounded whenever an erroneous entry was attempted. Accordingly, the operator is given an audible signal that something is not right. In addition, the program proceeds to the step 264 to display the DISP 2 bytes which are now digital data driving the seven segment displays 25 to show Err 3. The user either by means of a chart or by familiarity with the six error message codes is informed by the Err 3 display that an invalid button depression was attempted.

The program then returns to junction A to determine if time needs to be updated and to junction B to await keyboard activity. So long as the user holds his finger on the improper button, the error message will continue to be displayed. More particularly, the test 226 will continue to determine that a key is being pushed, branching the program to the test 227 which will continue to determine that flag F1 remains set. The positive result of that test branches to the test 247 which checks the condition of flag F5. Since flag F5 had been set as a result of making an erroneous entry, test 247 now tests positive, which returns the program to the block 264 which continues to display the DISP 2 bytes.

When the operator finally realizes his error and releases the key, the test 226 will become negative. The flat FT will be set at step 249 again without result. The step 250 will reset not only flag F1 but also flag F5. The buzzer will be turned off at step 251. The run mode test at 252 will provide a negative result, causing the program to again cycle through the loop which will ultimately return it to junction B to monitor keyboard activity.

Referring again to FIG. 5*d*, it is seen that if the operator had correctly entered the first digit of the hours to satisfy the test 238, and had later attempted to enter more than 12 hours by satisfying the test 254, and test 255, or had attempted to enter 60 or more minutes by satisfying the test 258, in all cases the program is caused to branch to the step 262, which results in the display of the Err 3 message, and the sounding of the buzzer just as has been described previously.

For the purpose of illustrating a different type of error message, assume that the operator in depressing one of the keys, did not depress it sufficiently to produce a clear detectable signal. If the switch depression is sufficient to produce a key pushed signal, the test 226 will be satisfied, causing the setting of flag F1 by the operation 228 and the ultimate arrival at node E of FIG. 5*c*. The operation 232 decodes the input from the keyboard to determine which key was depressed. However, if the signals on the eight lines to the input port are ambiguous, the test 233 will not be able to determine that the key value matches one of the sixteen keys, and according the test result will be negative. As a result, an operation 233*a* is performed which causes the information in display 2 to be altered to digital data representative of the message Err 2. Err 2 is the error message informing the operator that a button has not been properly pushed. Following execution of the operation 233*a*, the program returns to junction F on FIG. 5*b* in order to set flags, turn on the buzzer and output the display information all as had been done previously.

Recloaking our operator with his previous good fortune, and assuming that he has correctly entered four numerical digits for time, the pointer is moved to AM/PM at step 261 (FIG. 5*d*) as previously described, whereupon the program returns via test 241 to the previously described operations which decode DISP 3 into DISP 1, update time if necessary, then return to searching for further keyboard activity.

Referring briefly to FIG. 1, it is seen that the numerical key 1 is associated with the AM indicator and the numerical key 2 with the PM indicator in the functional block in question. Accordingly, the operator has those two choices (as well as simply using the cursor to move the pointer past AM/PM if the correct LED is lit) in entering data. When he depresses a key, test 226 will initiate the responsive loop just as described previously which will proceed to the step 236 (FIG. 5*d*), where it will now be determined that the pointer is not on time, causing the program to branch to step 265 which determines if the pointer is in the AM/PM functional block. In this case the test will be positive, causing the program to branch to the step 266 which tests for an invalid key depression. If the depressed key is invalid, the program proceeds to the step 262 which causes the Err 3 message to be displayed and the buzzer sounded. If test 266 determines the entry is valid, it proceeds to a step 267 which enters AM if the 1 button is depressed or PM if the 2 button is depressed, the entry being made into both DISP 3 and NEWTIME. Operation proceeds to a test at 268 where it is determined that the clock is not in the time mode. Accordingly, the program branches to the step 269 which causes the pointer to automatically move to the zone functional block. Just as at the end of each digit entry for time, the program then branches to the routines which decode DISP 3 into DISP 1, display DISP 1, check to determine if time needs to be updated, then returns to search for release of the depressed key.

Continuing the load operation, when a subsequent keystroke is detected, the previous sequence will be followed until the test 265 is encountered. Since the pointer is no longer on AM/PM, that test will now be negative, causing the program to advance to a test 270 to determine if the pointer is in the zone functional block. Since we have just shifted the pointer to that block, the test result will be positive, causing the execution of program steps which, in combination with the user interface elements of the system, provides means for associating a plurality output functions with a single time entry in any given programmed event. A test 271 is accomplished to determine whether the entry is valid. Since in the exemplary embodiment there are only six zones, numbered 1 through 6, depression of any other button will cause the test 271 to be positive, which will follow the previously described path, sound the buzzer and display the Err 3 message. However, assuming a valid entry is made, the test will be negative, causing the program to advance to a further test at 272 to determine if the keystroke is the first entry since the pointer arrived in the zone functional block. Since in the current instance it is, the test will be positive, which will first result in clearing all the information currently in the zone byte in DISP 3. The information which resulted from the keystroke will then be entered into the zone byte in DISP 3 by means off the step 274.

Returning to the test 272, assuming the keystroke were not the first, the step 274 would still be encountered but without the preliminary step of clearing the register. Accordingly, it will be appreciated that more than one zone can be dealt with by a single programmed event. This results not only from the internal structure of the system now being described, but also from the interaction of the display and pushbuttons which makes it logical to associate numerous operations with a single time, thus minimizing not only programming effort in setting up the system, but the amount of storage required for a full schedule of programmed events.

Following each entry made while the pointer remains in the zone functional block, the loop beginning with the test 270 will perform the operations thus far described, will cause DISP 3 information to be decoded into DISP 1, will cause DISP 1 information to be displayed, will update time if necessary and will return to node B to detect actuations of the keypad.

When the operator has entered all the zone information for the event in question, it is then necessary to take action to move the pointer from the zone functional block. Means are provided for positioning the pointer according to the desires of the operator in an easily understandable and easily operable manner. As noted in connection with the functional description, the cursor control keys 46, 47 cause the cursor to move one position left or right respectively for each depression. Accordingly, if the operator desires to move the pointer to the days functional block, he momentarily depresses the right cursor key 47.

Just as with the depression of a numerical key, the fact that a key has been pushed is sensed by the test 226 which initiates the key test loop described previously. The keyboard inputs are decoded at step 232, but test 234 determines that the key which initiated the loop is not one of the numbered pushbuttons. Accordingly, the program branches to junction J at FIG. 5*f* where a series of tests is performed to determine which of the non-numerical keys has been actuated. As shown in FIG. 5*f*, test 275 determines if the left cursor has been depressed, test 276—the right cursor, test 277—the function key, test 278—the erase key and test 279—the clear key. A negative result from test 279 covers the final possibility, actuation of the enter key. In the present instance the right cursor had been pushed, which causes the test 276 result to be positive. The test 280 determines that the system is not in the test or run mode, causing the program to branch to the test at 281. The test determines that the system is not in the time mode, causing the program to branch to a test at 281*a*. If it were determined that the pointer were on schedule (the far right functional block of FIG. 1), the test 281*a* would branch the program to display the Err 3 message, because the pointer cannot move further right. Since the pointer is on zone, the test 281*a* produces a negative result, calling operation 282 which serves to alter the data in register B to move the pointer to the right one step. Accordingly, the pointer advances from the zone functional block to the days functional block, where the operator can now program the days data. The program returns to the junction C which causes the previously described action of display decoding, display, time counting and key testing.

Further in practicing the invention, in addition to associating more than a single function with a given time in a single event, it is also possible to select any combination of days on which the function is to be executed. Accordingly, the program is provided with a loop which is entered following a negative result from the test 270, such loop beginning with a test 283 to determine if the pointer is on days. Since the pointer has just advanced to that functional block, the test result is negative, causing a branch to the test at 284 to determine whether the depressed button is a valid entry. An examination of the front panel shown in FIG. 1 reveals that the pushbuttons 1 through 7 are associated with the days of the week. Accordingly, depression of any other pushbutton will cause the test 284 result to be positive, causing a branch to the loop which shows Err 3 on the time display and sounds the buzzer. If a proper key is hit, the program branches to the test 285 to determine if the current key is the first key depressed in the days entry. If it is, the program proceeds to the step 286 which clears the information from the days byte in DISP 3 and to step 287 which clears the day information from NEWTIME. Finally, the step 288 is performed which transfers the entered digit to the appropriate days location in both NEWTIME and DISP 3. The test 241 is performed to determine that the system is not in the time mode, whereupon the common branch for display decoding, display, time updating and switch testing will be entered.

As noted above, in practicing the invention the system allows the entry of more than one day in an event. Accordingly, it is possible for the user to press additional keys which will ultimately cause a branch to the test 283, through the test 284 to the test 285 where it will be determined that the current key is not the first depressed in the days functional block. The program will then branch to a further test at 289 to determine if the system is in the time mode. If it were, only one day entry would be allowable since the operator would be attempting to set the current time of day. However, since the system is in the load mode, the test 289 result will be negative, causing the step 288 to be performed again, entering the additional data into the days byte in DISP 3 and NEWTIME. Such action can continue until the operator enters as many days as desired up to the full seven days.

When all of the desired days are entered, the operator again depresses the right cursor key 47 to cause the pointer to advance from the days position to the schedule position. Alternatively, if the normally displayed Schedule A indication is acceptable, there is no need to alter the schedule functional block. However, assuming that the schedule data requires alteration, the user depresses the right cursor key 287 which, just as in the loop previously described, causes the pointer to advance one notch, this time from the days to the schedule functional block.

Referring again to the front panel in FIG. 1, it is seen that the pushbuttons 1 and 2 are associated with the A and B schedules. Accordingly, a first test 289 is performed to determine if the key stroke is valid. It is noted that no test is made to determine if the point is on schedule, since if all the previous tests had resulted in negative conclusions, the only remaining pointer position is schedule. If the key stroke is determined by test 289 to be invalid, the program reverts to the display of the Err 3 message and sounding of the buzzer. However, if the key stroke is valid, the result of test 289 is negative, causing the test 290 to be performed to determine if the key depression is the first since entering the schedule functional block. If it is, the schedule bits in DISP 3 are cleared by the step 291 and then the new data entered via the step 292. Following that, the program returns to the decode display, display information, update time, and recheck for switches loops described previously.

In further expanding the capabilities of a single programmed event, if an event at a given time, for a particular array of days, and for a particular array of zones is desired for both the A and the B schedules, the event can be associated with both such schedules so as to avoid, to the greatest extent possible, duplication of event entries as well as operator action in entering the events. Accordingly, if another key is depressed, the program cycles through all the previously mentioned steps to the test at 289 where, if the key stroke is determined to be a valid one, the test 290 is performed which determines that the current key stroke is not the first key since entering the schedule functional block. Accordingly, a negative test result will branch directly to the step 292 which will cause the additional data to be entered.

The user has now programmed a full event, at least to the extent that it is entered into DISP 3, decoded and displayed via DISP 1. All of the information resulting from his keystrokes is displayed to him for checking. If an error is detected, it is only necessary to move the pointer to the functional block in which the error has been made, then to correct the entry. For that purpose, the cursor keys 46, 47 are provided which will result in positive tests at either the step 275 or 276, depending on which key is pushed. If the left cursor 275 is depressed, the program advances to a test 293 to determine if the pointer is in the mode functional block. Since it is not, the operation 294 is performed to move the pointer to the left one step. Subsequent depressions of the left cursor key 46 move the pointer to the left one step for each depression.

When the pointer is in the appropriate functional block, the displayed data in that block can be cleared by hitting the clear key 49 and new data written into the cleared memory locations. The test to detect depression of the clear key 49 is the test 279 in FIG. 5*f*, arrived at in the same manner as the previously described key identification tests. With the test at 279 determined to have a positive result, the program advances to a test 295 to determine if the clock is in the test or run mode. Since it is not possible to clear entries in either of those modes, if the test result is positive, the Err 3 message is displayed and buzzer sounded in the manner described previously. However, since under current conditions the test result is negative, the program advances to a further test at 296 to determine if the pointer is on mode or on AM/PM. Since it is not possible to clear mode or AM/PM (i.e., you must select one or the other), if the test 296 result is positive, the Err 3 message and buzzer are activated. Assuming the test result is negative, a further test is made at 297 to determine if the system is the time mode. If the test 297 result is positive, and if the subsequent test 298 determines that the pointer is on days, the system will again display the Err 3 message since a time entry must have a day and since in normal operation the stored day information is cleared first by every entry in days. Assuming both tests are negative, the program branches to an operation 299 which clears the bits in NEWTIME and in DISP 3 for the functional group associated with the active pointer. The program proceeds from the operation 299 to junction M at FIG. 5*d* which first performs the test 241 to determine that the system is not in the time mode, then returns to the main program loop. The operator is then in a position, with the pointer remaining in the cleared functional block, to enter new data to replace that which has just been cleared.

When the operator is satisfied that the event is displayed in accordance with his desires, it is then necessary to enter the event into DISP 4 event storage memory. To do so, the operator, while maintaining the system in the load mode simply depresses the enter key. In response thereto, the program progresses through its previously described loops, ultimately arriving at the test for the clear key at 279. Since the test is negative, the program proceeds to junction N of FIG. 5*g*. A test 300 is then performed to determine if the system is in the test or run mode. If it is, the program branches to junction L to perform the routines involved with displaying the Err 3 message and sounding the buzzer since the enter key is an invalid entry in the test or run modes. Since the system is in the load mode, the program advances beyond an edit mode test 301 to a load mode test 302 which produces a positive result. A further test 303 is performed to test the register C to determine if the number of events programmed (that is, resident in DISP 4) is equal to 114. In the exemplary embodiment DISP 4 has capacity for 114 events, and an attempt to enter more will cause the program to branch to junction L to perform the routines associated with displaying the Err 3 message. If the test 303 produces a negative result, the program advances to a test 304 which tests the data stored in DISP 3 to determine if the contents of the time bits, zone bits, days bits or schedule bits are zero. Since information is required in each of those areas for an event to have meaning, a positive test causes the program to branch to an operation 305 which changes the DISP 2 bytes to display an Err 4 message. Such error message indicates to the operator that event data is missing from the event being displayed. The program returns to the junction F at FIG. 5*b* which performs the routines associated with displaying the error message and sounding the buzzer. The operator then has the ability to enter whatever data is missing by appropriately positioning the cursor and entering the data as described above. However, assuming the test 304 is negative, indicating that data is present in each of the necessary blocks, the program advances to a test 306 to determine if the event being displayed is the first event being programmed, that is whether the DISP 4 area is empty. If it is, the program advances to the operation 307 which simply copies the DISP 3 area into DISP 4 such that the programmed event now resides in the first position. The program then increments the lower bits in register C by means of operation 308 so as to keep track of the number of events stored in the DISP 4 area. A test 309 is then performed to determine if the system is in the edit mode. If it is not, an operation 310 is performed to automatically return the pointer to the time functional block, facilitating the programming of the next event. The program then returns to the junction C of FIG. 5*b* for display decoding, display, time incrementing and pushbutton testing, all as described previously.

Returning for the moment to test 306, for events programmed after the first, the test produces a negative result branching the program to an operation 311 which compares the time of the event in DISP 3 to the time of each programmed event starting from the last stored in DISP 4. Such a comparison is made to allow the event currently stored in DISP 3 to be entered in a location in DISP 4 which will result in an orderly sequence of stored events in DISP 4 in time sequential order. Accordingly, a test 312 is performed to determine if the DISP 4 event in question has time data which is less than or equal to the time data stored in DISP 3. If the answer is negative, it indicates that the DISP 3 data should be higher in the DISP 4 list, unless, of course, the comparison was made with the first entry in DISP 4. To determine if the latter case exists, a test 313 is performed to determine if the comparison was made with the first event in DISP 4. If it was, the program branches to an operation 314 which in effect moves all of the events in the DISP 4 memory down one notch and an operation 307 which writes the data from DISP 3 into DISP 4 at the head of the table. Assuming, however, that, as in the normal case, the result of test 313 is negative, performance of the loop continues by employing step 315 to select the next event then returning to test 312 to test the time data of that event against that in DISP 3. When the test 312 determines that the time data in the DISP 4 entry being considered is less than or equal to the time data in DISP 3, the program branches to a test 316 to determine if the DISP 4 event time is equal to the DISP 3 event time. The test 316 begins a series of tests to prevent duplication of programmed events. If the time matches, a branch is made to a further test 317 to determine if any of the days in the data in the DISP 4 event being considered are the same as any of the days in the DISP 3 data. If that is the case, a positive result occurs, causing an operation 318 to be performed to change the DISP 2 bytes to display Err 5 whereupon the program advances to junction F at FIG. 5*b* which causes such message to be displayed and the buzzer to sound. Err 5 is coded to mean a duplicate event error.

Assuming the event has not been duplicated, the test 316 produces a negative result whereupon the program advances to an operation 319 which serves to create room in the DISP 4 table in the time sequential location to be accorded to the data in DISP 3. Everything below that location is moved down one notch and the data from DISP 3 entered into DISP 4 in the vacated location. Just as described previously, the operation 308 is executed to keep track of the fact that another event has been entered, and the operation 310 executed to return the pointer to time, whereupon the program returns to junction C and the main program loops.

By manipulating the keypad 21 and observing the display 22, the user can continue to enter the necessary events, causing each event to be loaded in its time sequential location into DISP 4. As noted above, DISP 4 has capacity for 114 full events. In considering that each event can perform multiple functions in dealing with multiple zones, multiple days and multiple schedules, system capacity is more than adequate for most applications.

When all the desired events are loaded, it may be desirable to enter the edit mode to check each event in turn against a written list, or to correct any events which might have been entered erroneously. To that end, the cursor key 46 is depressed which, in the manner described previously, ultimately causes the program to advance to the test 275 and to perform the function 294 to move the pointer to the left one step. The operator continues to step the pointer leftward until the mode functional block is reached. If the left cursor pushbutton is pressed with the pointer in the mode block, the test 293 determines that the pointer had been on mode before the key had been depressed and causes the program to branch to the junction L which causes the loading and display of the Err 3 message.

Referring briefly to FIG. 1, it is seen that the 2 pushbutton is associated with the edit mode. Accordingly, the operator, having positioned the pointer in the mode block, temporarily presses the 2 key in the keypad 21 to enter the edit mode. The response of the system to that operation will now be described.

Turning to FIG. 5*b*, after entering the flow at junction B, the normal tests previously described are accomplished ultimately arriving at the operation 232 of FIG. 5*c* which decodes the inputs from the keyboard to find which key is depressed. The test 233 determines that the key has been properly pushed and the test 234 that it is one of the numbered keys. The test 235 determines that the pointer is on mode and thereupon branches to a test 320 to determine if the depressed key is the zero key. Since it is not, a further test 321 determines whether the depressed key is less than 6. Since it is, the operation 322 is performed to reset flag F3 but without effect in these conditions. A test 323 is performed to check if key is 1. Since it is 2, the program advances to a test 324 which determines whether at least one event is programmed. If no events were programmed, the program would advance to an operation 325 which would change the data in DISP 2 to Err 6 ("no events programmed" error), then proceed to junction F and the subroutine which displays the error message and sounds the buzzer. Assuming that events had previously been programmed, the test 324 produces a positive result, advancing the program to a further test 326 to determine if the 2 key were the key depression which initiated this operation. Since it was, a further test 327 is conducted to determine if prior to detection of the keystroke, the system were in the edit mode. Since it was not, the program advances to an operation 328 which switches the system to the edit mode, and transfers the first event stored in DISP 4 into DISP 3. The program, by means of operation 329 then proceeds to decode the data in DISP 3 and store the decoded data in DISP 1 such that the information is switched from its storage format to its display format. The program then advances to junction D at FIG. 5*b*. The test 243, which determines whether the system is in the test or run mode, produces a negative result which advances the program to the operation 244 which causes the information in DISP 1 to be displayed. Accordingly, it is appreciated that the first event has been extracted from the DISP 4 memory, switched to the DISP 3 memory, then decoded into the DISP 1 memory whereupon it is routed by the processor to the output ports for display to the operator. The operator now has full visual contact with the entire contents of the first event message. The program proceeds through test 245 and operation 246 without effect whereupon it returns to junction A for incrementing of time if necessary and detection of switch actuations if any.

In order to advance the display to the next sequential event stored in DISP 4 memory, the operator again depresses the 2 pushbutton while the system remains with the pointer in the mode functional block. Operation proceeds exactly as just described until the test 327 of FIG. 5*c* is encountered. At that point, the system is in the edit mode such that the result of the test 327 is positive. Rather than execute the operation 328 as in the previous loop, the system branches to an operation 330 which, by utilizing the information in the C register, selects the next word in DISP 4 and transfers it, by means of operation 331 into DISP 3. Operation 329 is performed as before to decode the DISP 3 information into DISP 1, following which the operations previously described cause the information to be displayed. Each subsequent depression of the 2 button causes program flow through the same loop, causing the call up of the next sequential event from DISP 4 for ultimate display on the front panel indicators.

If it is desired to alter information in one of the displayed events, it is simply necessary to advance the pointer to the functional block to be altered, then utilize the clear key and re-enter the data, both functions being performed exactly in the manner described in connection with the load mode.

When a change is completed, the enter key is pushed to call the same loop described above except test 301 in this instance is positive. This results in deleting the event in DISP 4 which was brought into DISP 3 for changes. The number of events programmed (register C) is decremented. The remaining events in DISP 4 are moved up to fill the gap created by the deleted event. The same loop described in connection with the load mode continues from operation 311 which places this changed event in its time sequential order. Following storage of the event information in DISP 4, the test 309 produces a positive result to return the pointer to the mode functional block.

In the edit mode the user also has the option of completely erasing an event. To do so, the 2 button is used to display the event in question, following which the erase button 50 is pushed. The system responds by erasing the data in DISP 4 (for the event being displayed) and moving the remaining data up so that sequential locations in the DISP 4 area contain time sequential events.

The manner in which the program accomplishes that will now be described. Assuming the system is in the edit mode and the event in question is being displayed, the operator simply depresses the erase key. By program steps previously described, the program advances until test 278 is encountered, whereupon a positive answer indicates that the erase key has been depressed. A test 332 determines that the system is in the edit mode. Were it not, the program would branch to the junction L for display of the Err 3 message indicating an improper key had been depressed. However, since the system in the present circumstances is in the edit mode, a positive test result is produced, advancing the program to the operation 333 which erases the event data of the event currently being displayed from its location in DISP 4, and which decrements the number of programmed events in the register C by one. A test 334 is then performed to determine if the number of events remaining in the DISP 4 memory is zero. If it is, no events are loaded and the system automatically branches to an operation at 335 which switches back to the load mode. The system then returns to one of the main program entry points at junction C. However, assuming additional events are left in memory after the erasure of the event in question, a negative result of the test 334 is produced, which causes the execution of operation 336 to move the remaining events in DISP 4 up by one word each so as to fill the gap left by the deleted word. An operation 337 is then performed to move the next sequential event from DISP 4 to DISP 3 for the inspection of the operator. The program then returns to the routines beginning at junction C.

The repetitive steps by which the 0 and A registers are incremented for purposes of time keeping have previously been described. However, when the clock is first installed or after a power failure whose duration exceeds the capacity of the internal battery, it is necessary to enter the current time for purposes of "setting" the clock. To that end a time mode is provided which comprises means for initiating the clock at the current time of day. Referring briefly to FIG. 1, and the mode functional block 24, it is seen that the time mode is associated with pushbutton 3. Accordingly, to enter such mode it is necessary first to use the cursor control keys 46, 47 as previously described in order to move the pointer to the mode indicator 40. With that accomplished, the operator then depresses the 3 pushbutton. In the normal scanning of its ordinary routines, the depression of the key is detected by the test 226 which in the manner described causes the particular key to be decoded at the step 232 and determines from the test 234 that one of the numbered keys has been pushed. The program progresses to the test 235 to discover that the pointer is on mode, to the test 320 to determine that the zero key was not depressed and to the test 321 to determine that the key depressed was less than 6. The test 323 is negative since the 1 key was not depressed and, assuming at least one event has been programmed, the test 324 will be positive. Since the 2 key was not depressed, the test 326 will be negative, but the subsequent test 338 will determine that indeed the 3 key was depressed. As a result, the program branches to an operation 339 which serves to change the mode to the time mode and copy the information from the time register A into the NEWTIME register. This is a prelude to displaying to the operator the contents of the current time register. The program then proceeds to junction G of FIG. **5*b***.

At that point an operation 340 is performed which serves to decode the information in NEWTIME into DISP 2. Accordingly, the system now has the stored data from the time register decoded into display format in the DISP 2 area. The program progresses to the operation 264 which causes the display of the DISP 2 bytes. The operator is now in visual contact with the data that had been stored in the time register. The program proceeds to the junction A of FIG. **5*a*** to service the loops previously described.

After entering the time mode, it is then necessary for the operator to move the cursor to the time functional block for the purpose of entering the current time. Accordingly, the right cursor key 47 is depressed which, as described previously, ultimately satisfies the test 276. The subsequent test 280 results in a negative conclusion, but the test 281 determines that the system is in the time mode and thus advances to the test 341 to determine if the pointer is in the days functional block. Since the pointer was left in the mode functional block, the test result is negative which causes the program to advance to an operation 342 which serves to move the pointer to the right one step, that is from the mode block to the time block. A test 343 determines that the pointer is not in the zone block and thereupon branches the program to a function 344 which serves to decode NEWTIME into DISP 2. Since the contents of the time register had previously been transferred to NEWTIME, the clock then displays the data currently held as the current time.

In order to alter the current time, it is necessary for the operator to first enter a time including hours, minutes, AM/PM and days, such entered time being slightly in advance of the actual current time. After the entry is set up on the display, the operator then waits for the current time to approach the displayed time, and at exactly the zero seconds point, depresses the enter key which causes the displayed time to become the actual time stored in the time register and to be incremented by the timing loops previously described.

The manner in which the program flow accomplishes that will now be described. It is recalled that the description had advanced to the stage where the time mode was entered and the cursor moved to the time position 41. The operator must then sequentially enter four numerical digits relating to hours and minutes. Each keystroke is detected in the normal course by the program elements previously described in connection with FIG. 5*d*, and decoded in the normal course by the program elements previously described in connection with FIG. 5*c*. Since the pointer is not in the mode functional block, the test 235 routes the program flow to junction K on FIG. 5*d*. There the test 236 determines that the pointer is on time (just as was done in connection with entering time in a load operation). Similarly the test 237 determines that this is the first entry in time, the test 238 determines that the depressed key is not illegal, and the operation 239 performed to clear time digits in display 3 and NEWTIME. In the present case of setting time, the operation of interest is clearing of the digits in NEWTIME, rather than those in DISP 3 which are related to the load operation. The operation 240 causes the transfer of the entered digit to the tens hours position of NEWTIME as well as to DISP 3. The test 241 determines that the system is in the time mode which causes performance of an operation 345 which serves to decode NEWTIME into DISP 2. The program then returns to junction A on FIG. 5*a* for servicing of the normal loops whereupon it returns to junction B to cause the display of the information in DISP 2.

The particular program path for accomplishing such display is as follows. The AC power test 221 is positive and, assuming the key remains depressed, the test 226 is also positive. Since the flag F1 had been set by the initial detection of the depressed key, the test 227 is also positive which routes program flow to the test 247 to determine that the error flag F5 is not set. Since that test is negative, the program advances to test 248 to determine that the system is in the time mode and in response thereto routes the program flow to the operation 264 which commands the display of the DISP 2 bytes. The digit that the operator had entered is now displayed to him. The program returns to point A for servicing the time loop, and detecting release of the key.

The remaining three digits are entered in the same fashion, and upon completion of the entry of the fourth digit, the operation 261 moves the pointer to the AM/PM functional block, while the subroutine beginning at test 241 causes the information in NEWTIME to be displayed.

Entry of AM or PM data is accomplished by the same key strokes and by substantially the same program flow as that described in connection with the load mode. The only difference of note occurs in the program flow illustrated in FIG. 5*d*, where the test 268 is encountered. Since the system is now in the time mode, the result of the test 268 is positive which causes the execution of operation 346, to move the pointer from the AM/PM functional block to the days functional block, skipping over the zone functional block. That action facilitates the entry of time since the operator need not concern himself with zones at this stage, but is simply attempting to convey to the clock sufficient data concerning the current time of day. The current day of the week is then entered by depressing a numbered pushbutton associated with the day of the week in the same manner as described in connection with the load mode. The information is entered by the same program flow as described in connection therewith except that the time mode test 241 is positive rather than negative which serves to cause the performance of operation 345, that is decoding NEWTIME into DISP 2 for display of the information currently being entered by the operator.

Figure 5E:
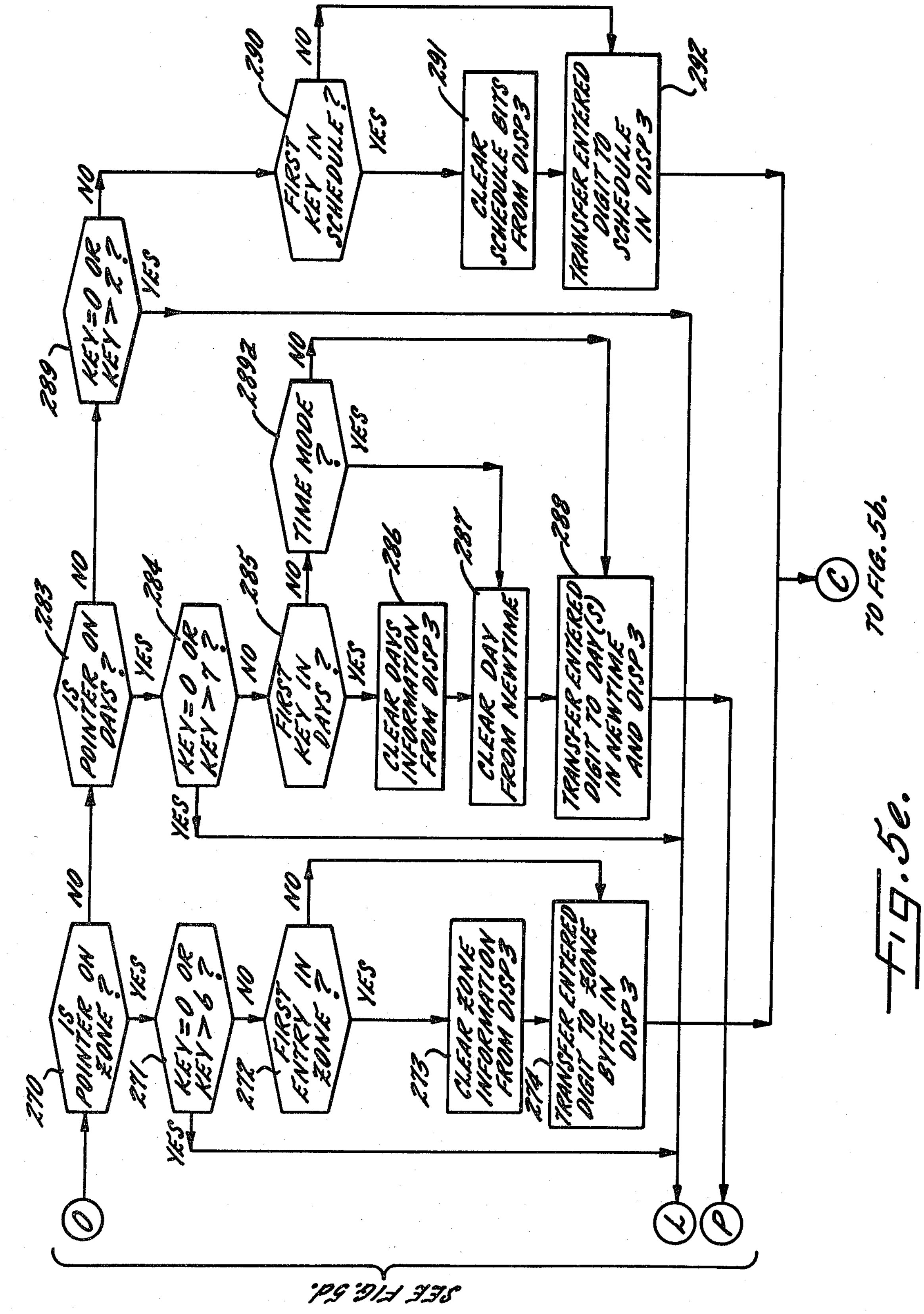
Figure 5F:
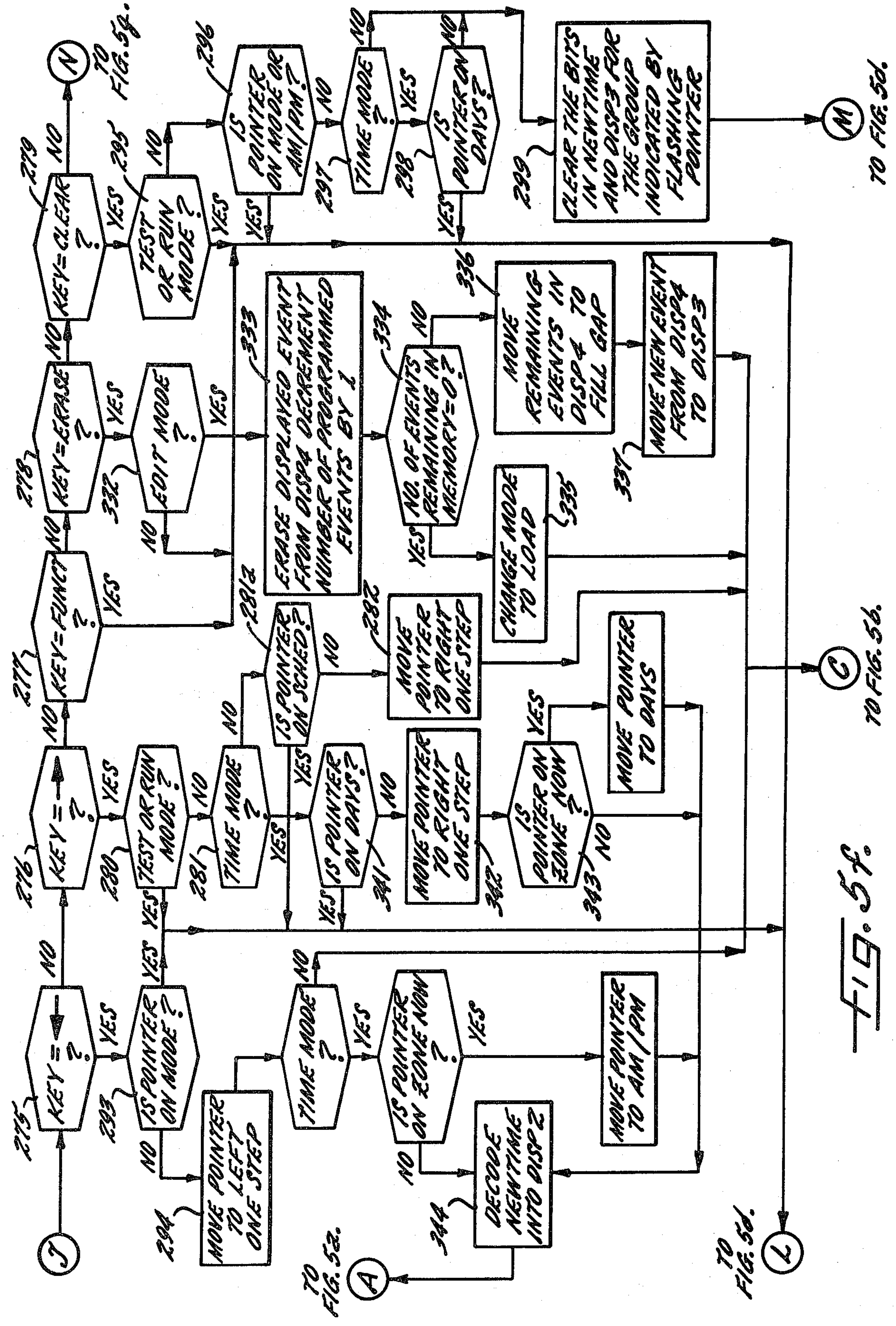
Figure 5G:
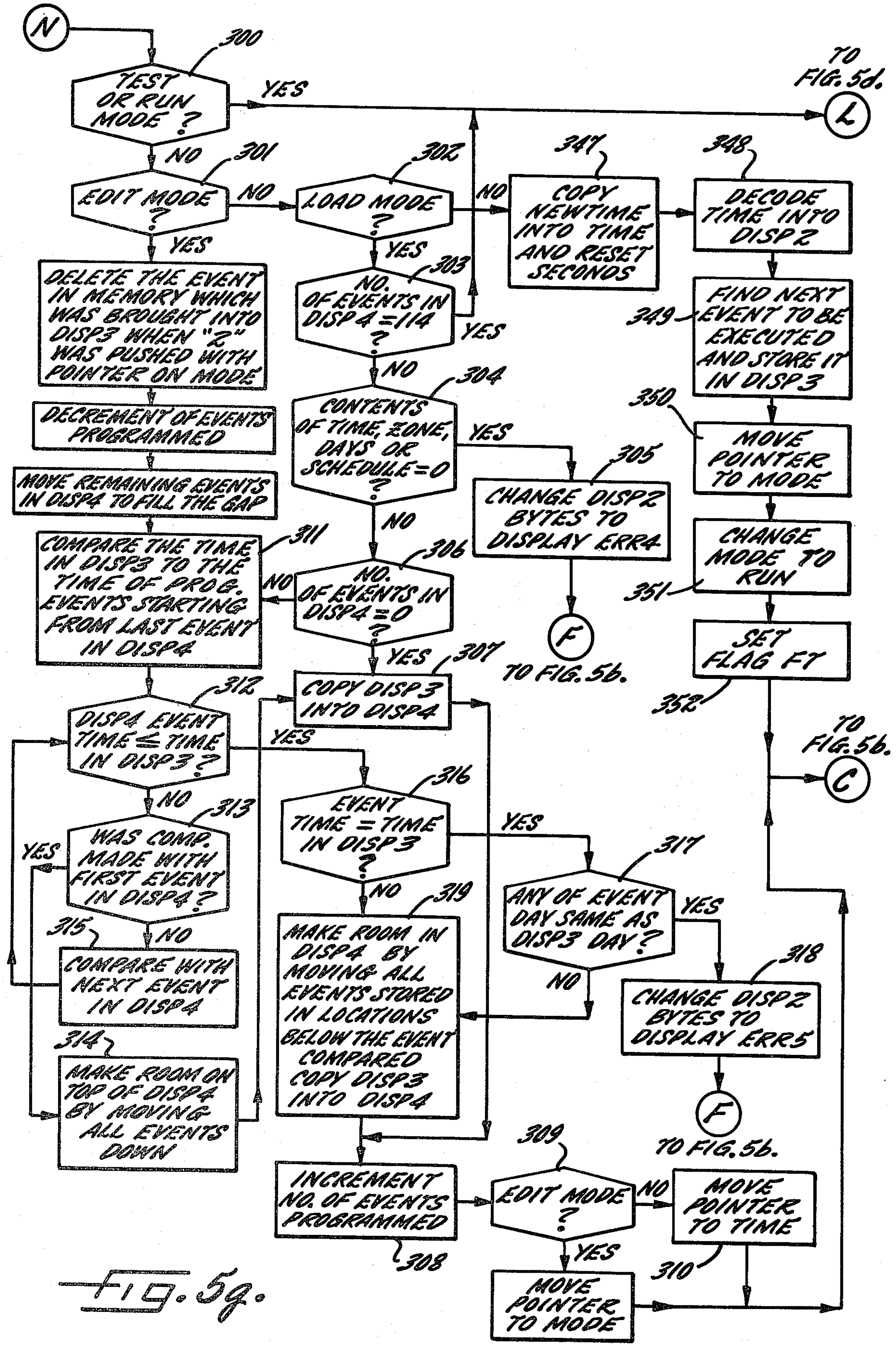

If, during the course of setting time, the operator hits a second numerical key while the pointer is on days, the test 285 on FIG. 5*e* determines that it is not the first key in days and, since the test 289 determines that the system is in the time mode, the operation 287 will again be performed to clear the days information from NEWTIME followed by the operation 288 which transfers the newly entered digit to the days location in NEWTIME. Accordingly, the last key depressed by the operator with the pointer in the days block is the day information which will be retained.

Following entry of time, AM/PM and day, the operator can verify the correctness of the data by viewing the visual display, while he continues to monitor the actual time. When the actual time matches exactly that set on the digital display, the operator presses the enter button 48 which serves to load the displayed time into the block as the current time.

Much of the program flow for accomplishing that, including that for detecting the keystroke and that for decoding the key, has been previously described. It will be apparent that the program will advance to the test 279 shown in the upper right portion of FIG. 5*f*. That test is negative, and since by process of elimination, the only remaining key is the enter key, the program branches to junction N in FIG. 5*g*.

The test 300 determines that the system is not in the test or run mode and the test 301 determines that the system is not in the edit mode. The test 302 determines that the system is not in the load mode which means the only remaining mode, the time mode is engaged. The test 302 thereby branches the program to an operation 347 which serves to copy the data in the NEWTIME register F into the time register A and to zero the seconds register 0. It is recalled that the register A is the register which is incremented by the register 0 which in turn is incremented by the 60 Hz line frequency. Following the operation 347, the system performs the operation 348 which serves to decode the data in the time register A into the DISP 2 register. Information in DISP 2 is now available in display rather than storage format such that when the DISP 2 area is called, information for current time is immediately available for display.

In carrying out the invention, in addition to maintaining a record of current time and maintaining a major store of events to be executed, register means are provided for separately storing the data of the next event to be executed. Such means are enhanced by maintaining a record within the register structure of the number of the event so stored. That, in combination with the storage of events in time sequential locations allows very simple retrieval of the next event to be executed. The program performs its major sorting function during the load and edit modes where pains are taken to assure that the events are properly indexed with reference to hour and minute. In executing the events, the system then need only retrieve the event in the location following the event number stored in register C, but must then compare the stored day information in the event against the current day to determine if the event is indeed the next to be executed on the current day. In addition, it is also necessary to determine the schedule under which the clock is operating (determined by the position of switches 33, 34) and to compare the operating schedule against the schedule information stored in the event. If a match for both days and schedule is detected, then the event is proper for execution and the data transferred to DISP 3 while the event number is stored in register C. If a match is not achieved, the event is skipped and the next event tested.

Returning to FIG. 5*g*, the program operation 349 performs the functions just described by finding the next event to be executed and storing it in DISP 3. Following execution of the operation 349, an operation 350 is performed which automatically moves the pointer from the days position to the mode position, following which an operation 351 changes the operating mode from time to run. An operation 352 sets the flag FT which is the signal to display the actual time while operating in the run mode. The program then returns to the routines which are initiated at junction C in FIG. 5*b*.

The operation 242 is executed to decode the information which has just been loaded into DISP 3 (from DISP 4) into DISP 1. The test 243 determines that the system is in the run mode and thereupon performs a test 353 to determine if the schedule switches have been changed by the operator since the test was last performed. A data location is provided in one of the registers, preferably in the mode and pointer register B, for storing the status of the schedule switches 33, 34, to detect if the operator has changed from one schedule to the other. Assuming that the schedule switches had been changed since the previous cycle, the test 353 results in a negative determination which causes the performance of an operation 354 to store the new schedule switch positions in the memory location assigned to this function. An operation 355 is then performed to find the next event to be executed in the current schedule, and store that event information in DISP 3. The program then advances to the operation 242 which decodes the DISP 3 information into DISP 1, changing the format from storage to display format. The test 243 then determines that the system is in the run mode. Assuming the schedule switches have not again been changed, the test 353 then determines that the schedule switches are the same as before, whereupon the program advances to the test 356 to determine if the system is in the test mode. Since it is not, the program branches to the test 357 to determine if the flag FT is set. It is recalled that the flag had previously been set by the operation 352. Accordingly, a positive determination is made which causes the program to branch to the operation 358 which results in display of the DISP 2 bytes of the front panel indicators. Thus, the current time of day is displayed to the operator while in this normal mode of operation. The program flow then advances to the step 245 to determine that the flag F9 is not set whereupon the operation 246 is performed without effect, and the program returned to junction A.

In the run mode, the operator is limited in his ability to affect clock operation by use of the keyboard. If it is desired to further limit response to the system to keystrokes, for example to prevent tampering, means are provided for electronically locking the keyboard. Such means are responsive to the simultaneous depression of two of the pushbuttons, in the illustrated embodiment the function and clear buttons.

When those buttons are depressed, the test 226 determines that a key is pushed and the test 227 determines that flag F1 is not set as previously described. The flag F1 is set by the operation 228 and the test 229 determines that the keyboard is not at the moment locked. The test 230 determines that the function and clear pushbuttons were simultaneously depressed whereupon the operation 359 is performed which serves to lock the keyboard. In response thereto, the pointer is extinguished, the current time continues to be displayed, but the system is generally unresponsive to keystrokes. Following the operation 359, a test 360 is performed to determine that the system is not in the time mode whereupon the program branches to operation 242 which decodes the DISP 3 information into DISP 1 following which the normal run sequence is cyclically executed.

With the keyboard locked, one of the keys to which the keyboard is responsive is the 0 key which causes the data for the next event to be executed, to be displayed. Actuation of the key advances the program to the test 229 in the normal fashion. However, in this case the keyboard is locked such that the result of the test 229 is positive. As a result, the program branches to a test 361 to determine if the function and enter keys have been pushed simultaneously. Since they were not, the result of the test is negative causing the program to advance to the test 362 to determine if the 0 button was pushed in the run mode. If any button other than 0 had been pushed in the run mode (or any button pushed in any other mode), the result of the test 362 is negative whereupon the operation 363 is called. Such operation serves to change the DISP 2 information bytes to display Err 1, which is an error message indicating "locked keyboard". The manner in which Err 1 is displayed and the buzzer sounded is the same as that for any other error message.

Assuming, however, that the 0 pushbutton was pressed in the run mode, the result of test 362 is positive, causing the program to branch to the operation 363, which serves to reset flag FT. It is recalled that flag FT causes current time to be displayed in the run mode. Following operation 363, the program returns to junction A in FIG. 5*a* for counting time and servicing the keyboard.

The program continues its normal cycle until ultimately it goes through the run subroutine beginning with test 243 in FIG. 5*b*. Assuming the schedule switches remain the same to satisfy the test 353, and the system remains in the run mode to satisfy the test 356, the test 357 is encountered to determine if the flag FT is set. Rather than in normal operation where the test result is positive, since the flag was reset by step 363, the test result is now negative causing the program to branch to execute function 244, to cause the display of the DISP 1 bytes (in contrast to the other branch which would have caused the display of the DISP 2 bytes). Thus, for so long as the 0 button is held depressed, the next event will be displayed to the operator. When it is desired to return to display of actual time, the operator simply releases the 0 button. The test 226 then determines that no key is pushed following which the operation 249 sets the flag FT such that cycling continues as normal.

For the purpose of unlocking the keyboard, means are provided for detecting simultaneous actuation of a pair of keys, in the illustrated embodiment the function and enter pushbuttons. It is seen that the test 361 is interposed in the normal program flow whenever the keyboard is locked, such flow being caused by the positive result of the test 229. If the keys in question are simultaneously depressed, rather than the program flow described above, the test result will be positive, causing the calling of the operation 370 which serves to unlock the keyboard and turn on the pointer. The program flow then returns to normal, commencing at the junction A of FIG. 5*a*.

In accordance with one feature of the present invention, means are provided for easily updating the current time to or from daylight savings time. In accomplishing that aspect of the invention, the keyboard is unlocked in the manner described previously. It is also necessary to have the system in the run mode and the pointer in the mode functional block. In that condition keys which are not normally associated with this functional block are used to increment or decrement the register A by 1 hour.

With the system in the condition described, if the 7 pushbutton is depressed, program flow ultimately progresses to FIG. 5*c* where the keystroke is decoded at operation 232, and test 234 determines that one of the numbered keys has been pressed. Test 235 determines that the pointer is on mode, but test 320 and 321 are both negative since the depressed key is not within the normal group associated with the mode functional block. Accordingly, a test 364 is performed to determine if the system is in the run mode. If it is not, the program branches to the operation 365 which changes the DISP 2 information to display the Err 3 message in the manner described above, indicating to the operator that an improper key has been depressed. However, in the present circumstances, the system was in the run mode such that the test is positive, branching the program to a further test at 365*a*. Since the 7 key was depressed, the test result is positive, which causes the calling of the function 366 to decrement the Register A by 1 hour. Function 367 then decodes the new information in the time register into DISP 2 for ultimate display of that information. In addition, it is necessary to update the next event to be executed and the operation 368 determines from the current time, as revised, the next event to be executed and stores that event in DISP 3. The program then advances to operation 329 to decode DISP 3 data into DISP 1 so that DISP 1 and 2 now contain the next event to be executed and the current time, both sets of data being ready for display. The program then returns to the junction D on FIG. 5*b* to enter the run subroutine which commences there.

If the 9 key had been depressed instead of the 7 key, the test 365 shown in FIG. 5*c* becomes negative, but the subsequent test 359 becomes positive since it tests for the 9 key. As a result, the operation 370 is performed to increment the Register A by one hour. The remaining steps 367, 368 and 329 are performed to update the information in the display registers.

As a further feature of the system, the operator has the ability to display the number of events then resident within the DISP 4 area of the memory. In order to accomplish that, the operator uses the cursor control keys to bring the pointer to the mode functional block and enters the load mode. The operator then depresses the 0 key which advances the program in the manner previously described through the test 234 to the test 235 which yields a positive result. Since the 0 key had been pressed, the test 320 also yields a positive result advancing the program to test 378. Since the system is in the load mode, that result is also positive which causes the calling of the function 379 which serves to set a flag F5. The flag F5 is typically used to indicate the display of an error message, but more generally is characterized as display of a miscellaneous function. The function 380 is then called to decode the number of programmed events from the register C into the DISP 2 register. The program then advances to junction I in FIG. 5*b* which performs the function 358 to display the information decoded into DISP 2. The program proceeds to the test 245 which determines that flag F9 is not set, proceeds through function 246 without effect, then returns to junction A in FIG. 5*a* for continued cycling. The fact that flag F5 is set continues to call the test 247 and the operation 264 to display the number of events. When the 0 button is released, the test 226 produces a negative result which causes the resetting of flag F5 at operation 250, returning the system to normal.

During the normal course, the programmable clock according to this invention can be expected to spend most of its time in the run mode, with its most important task being keeping track of and storing the current time of day, matching the current time against the programmed timed data of the next event to be executed (stored in DISP 3), and executing the programmed event when the current and programmed time match. The manner in which the clock is set to the correct current time, and the manner in which the system functions to update current time have previously been described. Attention will now be directed to the structure by which the system controls and causes the execution of the programmed events.

Turning again to FIG. 5*a*, it is seen that whenever the minute data is incremented at the step 212, the program flow ultimately arrives at the operation 214, which decodes the updated current time into DISP 2. The program flow proceeds to the test 215 which, if the run mode is engaged, produces a negative result, then to the run mode test 216 which produces a positive result. A test 390 is then performed to determine if the current time matches the event time stored in DISP 3. Since in selecting event data from DISP 4 for temporary storage in DISP 3, the program had checked not only time, but also AM/PM, days and schedule data in isolating the next event for execution, the test 390 therefore need concern itself only with the hours and minutes portion of the data in DISP 3. When a match is achieved, the test 390 produces a positive result to advance program flow to call the operation 391. As a result, the zones which are programmed in the event in question are activated by energizing the associated relays, and a trigger signal is sent to the zone timer. The program advances to call operation 392 to set flag F9.

The operation 393 is performed to find the next event in DISP 4 to be executed and to store that information in DISP 3. The system makes use of the information in register C which identifies the number of the event which is currently being executed. That data is incremented by 1 to find the next event in DISP 4. Since the events in DISP 4 are indexed by time of day (including AM and PM), and since each event can have a plurality of functions as emphasized above, simply locating the next event in the table is inadequate to assure that it represents the next event to be executed. Accordingly, means are provided for checking additional data within the located event, particularly the days of the week data, and the schedule data, to assure that the located event is the next event to be executed under the present operating conditions. If it is, the step 393 causes that information to be written into the DISP 3 area. However, if it is not, the system again increments the event number data so as to step to the next event in the DISP 4 table and perform the aforementioned test. By these means, the events can be indexed in DISP 4 according to time of day, and means are provided for selecting from the data in that table the next event to be executed using as criteria not only time of day, but also day of week and schedule.

With DISP 3 written with information on the next event to be executed, the step 394 is called which decodes the information in DISP 3 into DISP 1. The program then returns to the main program loop at junction B, and assuming the flag FT remains set, continues to display the current time by means of operation 244 (FIG. 5*b*). Following the step 244, however, the program takes a branch not previously described due to the fact that flag F9 has been set, indicating execution of an event.

The test 245, rather than producing a negative result as previously described, now produces a positive result, indicating flag F9 is set. The program then branches to a test 377 to determine if the event timer is reset. For so long as the timer continues to time out, the result of test 377 is negative, returning the program to the main loop at junction A for servicing of other subroutines and ultimate return to the test 377. When the timer times out, indicating the expiration of the user selectable event duration, the test 377 result becomes positive, branching the program to an operation 246 which causes the output zone relays and the flag F9 to be reset. Execution of the event has now been completed, the next event to be executed had previously been stored in DISP 3, and when the current time matches that programmed into the DISP 3 event, that event will be executed following the procedure just described.

As a further feature of the invention, a test mode is provided for not only reviewing the events on command rather than at their appointed execution time, but also for executing such events on command. The test mode is entered by using the cursor keys to advance the pointer to the mode functional block. It is seen from FIG. 1 that the test mode is associated with the pushbutton 4, such that the front panel indicia advises the operator to then depress pushbutton 4 if he desires to enter the test mode. Upon depression of the pushbutton, the key is detected and decoded in the normal fashion. The program advances in the manner previously described beyond test 338 of FIG. 5*c* to a test 371 which determines that indeed the 4 pushbutton has been depressed. Were it not, the only other possibility would be depression of the 5 pushbutton with the pointer in the mode functional block which would have caused the execution of a step 372 which changes the mode of the system to the run mode, then returns to the normal program flow. That is the manual method of changing to run in contrast to the automatic method previously described.

However, returning to the set of circumstances at hand, the test 371 yields a positive result which branches the program to a test 373 to determine if the system is in the test mode. At the moment it is not since the operator is attempting to enter that mode. As a result, the operation 374 is performed to change the mode to test, following which the operation 368 is executed to extract the next event to be executed from DISP 4 and store it in DISP 3. Selection criteria, in addition to time of day includes days and schedule, so as to choose from the data indexed only by time of day, the true "next event" under the current operating conditions. The storage format of the data in DISP 3 is changed to display format for storage in DISP 1 by the operation 329, whereupon the program advances to the test 243 on FIG. 5*b*. Just as in the case of the run mode, the test 243 is positive, and assuming the schedule switches remain unchanged, the test 353 is positive. However, at the test 356 the program flow differs from that previously described in the run mode since the result of test mode test 356 is positive. As a result, the program branches to the operation 244 to display the information in DISP 1, that is to display the data relating to the next event to be executed. The test 245 of the flag F9 remains negative at the current time, so that operation advances through operation 246 to the main loop at junction A.

In the test mode, the operator has two modes of operation available to him. He can review and execute events in sequence by sequentially depressing the 4 pushbutton. Alternatively, he can automatically ring all of the bells in the system at timed intervals for purposes of testing the bells.

Turning to the first option, when the operator decides to execute the event which has just been called up to display, he again depresses the 4 pushbutton. The program advances to the various tests described previously, to arrive at the test 371 which again determines that the 4 key has been depressed while the pointer remains in the mode functional block. The program as previously described branches to the test 373. However, since the system is now in the test mode, the result of the test 373 is positive which causes the execution of operation 375 to turn on the zones programmed in the displayed event, and trigger the timer (89 of FIG. 2*b*). The system then proceeds to the operation 376 to set flag F9, following which functions 368 and 329 are performed to retrieve the next event to be executed, store it in DISP 3 and decode it for display into DISP 1.

Normal program flow continues, with the main features being execution of operation 244 to display the next event bytes previously decoded into DISP 1, and testing of the loop involving test 377 to detect the resetting of the event timer. Upon such resetting, the operation 246 is called, as previously described in connection with the run mode, to reset flag F9 and deenergize the output relays. Thus, the system has retrieved and executed the first event upon command, and is now displaying the second event. If the operator desires to execute the second event and retrieve the third, he again presses the 4 button which repeats the operations just described.

With respect to the second mode of operation in test, the operator has the ability to cycle all the signalling devices in all of the zones, in the exemplary embodiment at one minute intervals on the minute. To enter the mode, the operator depresses the 0 button and to reset the mode the operator depresses the 5 button.

When the 0 pushbutton is pushed to engage this feature, the program flow again returns to FIG. 5*c* where a positive result for test 235 routes the program to the test 320. In this case, the 0 key had been pressed such that the program will advance to the test 378 to determine if the system is in the load mode. Since the system is not in the load mode, the test 378 produces a negative result advancing to a test 381 to determine that the system is in the test mode.

The positive result of test 381 branches the program to operation 382 which sets the flags F3 and F9. It is recalled that the flag F9 causes the program to divert from its normal route to a test of the event timer. The flag F3 is used only in this mode of operation for determining the 0 second instant, and energizing the zone outputs and the event timer at that point. Immediately following the operation 382, the function 383 is called to turn on all zones and trigger the event timer. The program sequence then reverts to junction D of FIG. 5*b* with the periodic test of the event timer until the timer times out.

Returning to FIG. 5*a*, when the junction A is reentered, it is recalled that the early steps of that sequence count the sixty Hz time base to increment seconds, and keep track of seconds to increment the minute counter. The latter function is performed by the functional blocks 211, 212. Whenever the minute is incremented, the program advances from the function 212 to the test at 213. It will be apparent that operation 214 is performed either because of the negative result of test 213 or because of the tests following 213. Calling the operation 214 decodes the updated current time into DISP 2. Significantly, the program then advances to the test 215 which, in the present circumstances yields a positive result, branching to a test 385 which determines if the flag F3 is set. In the present circumstances, it is, such that the program advances to call function 386 which again activates all zones and triggers the event timer, following which function 387 is called to set flag F9. The program then returns to the major junction B for sequencing as has been previously described.

For so long as flag F3 remains set, the latter loop will be entered each time the minutes are incremented such that all of the bells in the system are energized at one minute intervals on the minute while the energization continues for the duration associated with the event timer 89 of FIG. 2*b*.

It will now be apparent that what has been provided is a programmable clock having very advanced capabilities, but at the same time being programmable by a comparatively unsophisticated user. The system reduces the number of programmed events which must be entered by combining all events for a particular time of day so as to be able to include for a given time of day one or more days, one or more zones, and one or more schedules. Thus, the number of actual events which need to be programmed is substantially reduced. In addition, means are provided for indicating immediately to the operator that an error has occurred and also suggesting to him the nature of the error by distinguishing between a number of possible errors.

It is also worthy of note that while the system has been described in the school environment for control of audible signals, it has capabilities to accomplish additional functions. For example, assuming the clock is particularly adapted to school environment, when it is in that environment, in addition to controlling signaling, it can also perform the function of energy management by the simple expedient of providing on/off controls for additional zones. The essential features of the ability to enter and execute complex events, combined with the immediate error message prompting will achieve the advantages described herein.

We claim:

1. A user programmable clock comprising in combination, processor means, a keyboard for signalling the processor, a visual display for displaying information from the the processor including separate locations for time, a plurality of active days, and a plurality of active zone positions; a display memory having a plurality of event locations, each event location including means for storing time information and information for a plurality of days and zones; the processor including means for interpreting keystrokes on the keyboard and in response thereto entering information into event locations in the display memory and also activating the display to display the entered information, means for storing the current time and day, means for locating the stored event next in time in the display memory, said last mentioned means including means for comparing the stored day information with the current day, and means for executing said stored event at the time and day and in the zones indicated by the information stored therein.

2. The user programmable clock according to claim 1 in which the system includes means for storing event information in the display memory in sequential locations indexed by time of day without regard to day of week.

3. The user programmable clock as set out in claim 2 further including an interval timer having operator accessible adjustment means for selecting the duration of an event, means for triggering the event timer upon executing an event, means for sensing the timer output to determine expiration of the time interval, and means for terminating event execution upon detection of timer interval expiration.

4. The user programmable clock as set out in claim 2 including means for sensing concurrent actuation of a predetermined pair of keys on the keyboard, and means responsive to the sensing means for transferring the keyboard from an active unlocked condition to an inactive locked condition.

5. The user programmable clock as set out in claim 4 including means for detecting keystrokes when the keyboard is in its locked condition, and means responsive to the last mentioned means for indicating a "locked keyboard" error.

6. The user programmable clock as set out in claim 4 including means for sensing simultaneous actuation of a further predetermined pair of keys on the keyboard, and means responsive to the last mentioned means for transferring the keyboard from an inactive locked condition to an active unlocked condition.

7. A user programmable clock comprising in combination, a signal processor, a keyboard for signalling the processor, a visual display having a plurality of event data functional blocks including a numerical display block for showing the time of day, a zone display block having a plurality of positions corresponding to a plurality of zones to be controlled, a day of the week display block having a plurality of positions corresponding to the days of the week; the visual display also having a mode functional block having a plurality of positions corresponding to the respective modes of operation of the clock, and indicator means associated with each of the functional blocks; bidirectional indicator moving means for selecting an indicator position and enabling the processor to control the function associated with the selected block, the processor including means for responding to keystrokes to store data for time, a plurality of days and a plurality of zones in respective locations identified by the indicator to assemble an event word having respective locations associated with the event data functional blocks, display memory means having a plurality of locations for storing a plurality of event words, and means for transferring an assembled event word to the display memory means.

8. The user programmable clock as set out in claim 7 including means for storing and updating the current time of day, means for comparing the stored current time against the stored event time in the event words in the display memory to select the next event in time to be executed, means for comparing the current day of the week against the stored day data, and means responsive to the detection of a match by the last mentioned means for transferring the compared event word to temporary storage means for execution of said event at the programmed time.

9. The user programmable clock as set out in claim 7 wherein the means for transferring an assembled event to the display memory includes means for comparing the time of day data in the assembled event to the time of day data in the display memory events so as to determine a location in the display memory for the assembled event in time sequential order.

10. The user programmable clock as set out in claim 9 including means responsive to detection of an event in the display memory having the same time data as that of the assembled event, means responsive to the last mentioned means for checking the day data of the assembled event against the day data of the display memory event in question, means for preventing transfer of the assembled event if the last mentioned means indicates a match thereby to prevent entry of duplicative data, and means for displaying an error message indicating "duplicate entry".

11. The user programmable clock as set out in claim 7 wherein the processor includes means for preventing the transfer of an assembled data word when data is missing from at least one of the locations associated with an event data functional block, and means for indicating an "event data missing" error message.

12. The programmable clock as set out in claim 7 further including means associated with the mode functional block for engaging a test mode, said last mentioned means including means for sequentially extracting from the display memory event words and driving the visual display to show the contents of said event words, and means for executing a displayed event on command.

13. The programmable clock as set out in claim 7 further including means associated with the mode functional block for engaging an edit mode, said last mentioned means including means for calling up in sequence event data words from the display memory to drive the visual display showing the content of said event data words, means for responding to the bidirectional indicator moving means and subsequent keystrokes for editing data in a displayed event word and means for transferring the edited event word to the display memory means in a location indexed by the time of day information.

14. The user programmable clock as set out in claim 7 including means for sensing concurrent actuation of a predetermined pair of keys on the keyboard, and means responsive to the sensing means for transferring the keyboard from an active unlocked condition to an inactive locked condition.

15. The user programmable clock as set out in claim 14 including means for detecting keystrokes when the keyboard is in its locked condition, and means responsive to the last mentioned means for indicating a "locked keyboard" error.

16. The user programmable clock as set out in claim 14 including means for sensing simultaneous actuation of a further predetermined pair of keys on the keyboard, and means responsive to the last mentioned means for transferring the keyboard from an inactive locked condition to an active unlocked condition.

17. The user programmable clock as set out in claim 7 wherein the processor includes means activated when the indicator is in the mode functional block for responding to user keystrokes associated with the respective operating modes for switching between said modes.

18. The user programmable clock as set out in claim 7 further including an interval timer having operator accessible adjustment means for selecting the duration of an event, means for triggering the event timer at the initiation of an event, means for sensing the timer output to determine expiration of the time interval, and means for terminating event execution upon detection of timer interval expiration.

19. The user programmable clock as set out in claim 7 further including a plurality of manually operable switch means associated with the respective zones for manual control of the associated zones, and a single manually operable switch means for simultaneous manual control of all said zones.

20. A user programmable clock comprising in combination, a signal processor, a keyboard for signalling the processor, a visual display having a plurality of event data functional blocks including a numerical display block for showing the time of day, a zone display block having a plurality of positions corresponding to a plurality of zones to be controlled, a day of the week display block having a plurality of positions corresponding to the days of the week; the visual display also having a mode functional block having a plurality of positions corresponding to the respective modes of operation of the clock, and indicator means associated with each of the functional blocks; indicator positioning means on the keyboard for providing user accessible means for selectively positioning the indicator in any of the functional blocks, the processor including means for responding to indicator position to enter data for time, a plurality of zones or a plurality of days in response to keystrokes in only the functional block indicated by the indicator; means for testing validity of keystrokes in each of the functional blocks to detect an illegal entry therein, and means for signalling error messages indicating the nature of a detected erroneous keystroke.

21. A user programmable clock comprising in combination, a signal processor, a keyboard for signalling the processor, a visual display having a plurality of event data functional blocks including a numerical display block for showing the time of day, a zone display block having a plurality of positions corresponding to a plurality of zones to be controlled, a day of the week display block having a plurality of positions corresponding to the days of the week; the visual display also having a mode functional block having a plurality of positions corresponding to the respective modes of operation of the clock, and indicator means associated with each of the functional blocks; temporary storage means having respective locations for receiving data relating to time, the plurality of days and the plurality of zones corresponding to the respective functional blocks, operator accessible indicator positioning means for selectively positioning the indicator in any of the functional blocks, the processor including means responsive to the indicator position for routing data resulting from keystrokes to the locations associated with the functional block identified by the indicator, whereby the operator can individually position the indicator and alter data in each of the functional blocks irrespective of the data in any other functional block, and means combining the data in all of the functional blocks into a single event, said last mentioned means including means for transferring an assembled event word to a data memory having a plurality of locations for respective event words.

22. The user programmable clock as set out in claim 21 further including editing means for retrieving a stored event word from the display memory and temporarily storing said word for driving the visual display to indicate the data contents thereof, the editing means including means for positioning the pointer and entering or deleting data in one or more selected functional blocks without affecting data in said other blocks, and means for transferring the edited assembled event word back to the display memory means.

23. A user programmable clock comprising in combination, a signal processor, a keyboard for signalling the processor, a visual display having a plurality of event data functional blocks including a numerical display block for showing the time of day, a zone display block having a plurality of positions corresponding to a plurality of zones to be controlled, a day of the week display block having a plurality of positions corresponding to the days of the week; and indicator means associated with each of the functional blocks, storage means for assembling an event word having data relating to time, the plurality of days and the plurality of zones corresponding to each of the functional blocks, the processor including means responsive to indicator position for routing data resulting from keystrokes to event data word locations associated with the functional block identified by the indicator, the keyboard also including manually operable indicator positioning means for selectively moving the indicator from functional block to functional block, thereby to terminate a data entry in one functional block to commence data entry in another functional block.

24. A user programmable clock comprising in combination, a signal processor, a keyboard for signalling the processor, a visual display having a plurality of event data functional blocks including a numerical display block for showing the time of day, a zone display block having a plurality of positions corresponding to a plurality of zones to be controlled, a day of the week display block having a plurality of positions corresponding to the days of the week; the visual display also having a mode functional block having a plurality of positions corresponding to the respective modes of operation of the clock, and indicator means associated with each of the functional blocks; indicator positioning means on the keyboard for providing user accessible means for selectively positioning the indicator in any of the functional blocks, the processor including means for testing validity of keystrokes to determine if each keystroke is valid or invalid, means for displaying the data including time, a plurality of days and a plurality of zones entered with each valid keystroke after receipt thereof, and means for displaying an error message indicating the nature of the error in response to each invalid keystroke, whereby said clock produces a visual indication following each keystroke to appraise the user of the action taken.

25. The user programmable clock as set out in claim 7 wherein the event words are stored in the display memory in locations indexed by the time of day information.

* * * * *

UNITED STATES PATENT AND TRADEMARK OFFICE
CERTIFICATE OF CORRECTION

PATENT NO. : 4,387,420

DATED : June 7, 1983

INVENTOR(S) : Dilip T. Singhi and James E. Dahlquist

It is certified that error appears in the above—identified patent and that said Letters Patent is hereby corrected as shown below:

Col. 7, l. 68, change "the" to -- like --.

Col. 13, l. 54, change "FIG." to -- Flag --.

Col. 17, l. 5, change "off" to -- of --.

In the claims:

Claim 9, col. 35, line 21,change "7" to -- 25 --.

Claim 12, col. 35, line 45, change "7" to -- 25 --.

Claim 13, col. 35, line 53, change "7" to -- 25 --.

Signed and Sealed this

*Ninth* Day of *August 1983*

[SEAL]

*Attest:*

GERALD J. MOSSINGHOFF

*Attesting Officer* *Commissioner of Patents and Trademarks*